(12) United States Patent
Blackmer

(10) Patent No.: US 6,505,146 B1
(45) Date of Patent: Jan. 7, 2003

(54) METHOD AND SYSTEM FOR SPATIAL EVALUATION OF FIELD AND CROP PERFORMANCE

(75) Inventor: Tracy M. Blackmer, Huxley, IA (US)

(73) Assignee: Monsanto Company, St. Louis, MO (US)

(*) Notice: Subject to any disclaimer, the term of this patent is extended or adjusted under 35 U.S.C. 154(b) by 0 days.

(21) Appl. No.: 09/404,978

(22) Filed: Sep. 24, 1999

(51) Int. Cl.$^7$ ............................................. G06F 15/00

(52) U.S. Cl. ..................... 702/189; 701/50; 340/991

(58) Field of Search .................... 702/189, 35, 36, 702/5; 701/213, 214, 215, 50, 51; 700/89, 86; 340/989, 990, 991, 992, 993

(56) References Cited

U.S. PATENT DOCUMENTS

| | | | |
|---|---|---|---|
| 5,751,576 A | * 5/1998 | Monson | 700/83 |
| 5,771,169 A | * 6/1998 | Wendte | 702/5 |
| 5,886,662 A | * 3/1999 | Johnson | 342/26 |
| 5,938,709 A | * 8/1999 | Hale et al. | 701/50 |
| 5,955,973 A | * 9/1999 | Anderson | 340/988 |
| 5,957,773 A | * 9/1999 | Olmested et al. | 460/7 |
| 6,119,069 A | * 9/2000 | McCauley | 702/5 |
| 6,212,824 B1 | * 4/2001 | Orr et al. | 47/58.1 |

\* cited by examiner

*Primary Examiner*—Marc S. Hoff
*Assistant Examiner*—Mohamed Charioui
(74) *Attorney, Agent, or Firm*—Fulbright & Jaworski LLP

(57) ABSTRACT

The invention provides a method for analyzing spatial variations in field and crop performance. The method allows analysis of the field and crop performance as a function of various treatment and/or environmental conditions. This method is an advance over the prior art in that it allows better defined, more accurate comparisons of adjacent test areas, eliminating the need for extrapolation of data and avoiding inaccuracies therefrom. Also, the more accurate comparisons allow better characterization of effects due to the environment, such as those caused by genotype by environment (G×E) interaction. The more accurately defined comparison units also lead to improved analysis when comparing to other data layers for non-spatial analysis. The invention also provides a system for carrying out this method. The system preferably includes a device for inputting spatially-referenced data, a memory, an output device, and a processor. The output data may be represented spatially or non-spatially. The information provided by the method and system of the invention will allow farmers to make more informed decisions regarding seed and farming inputs and practices, thereby maximizing agricultural productivity.

68 Claims, 10 Drawing Sheets

METHOD AND SYSTEM FOR SPATIAL EVALUATION OF FIELD AND CROP PERFORMANCE

BACKGROUND OF THE INVENTION

1. Field of the Invention

The present invention relates generally to the field of agriculture. More particularly, it concerns methods and compositions for the spatial evaluation of field characteristics including crop performance and environmental conditions.

2. Description of Related Art

Today's farmer has available a wide array of methods, machines, chemicals, and crops that make farming more efficient. Due in part to improvements in technology, the long-term trend in farming has been a steady increase in farm size as more land is brought into production, and as new farm machinery and methods have made a farmer capable of caring for more and more land. Large machinery is available which can till, fertilize, and harvest larger acreages than ever before. The need for efficiency has been the impetus behind these trends.

A fairly recent development in farming efficiency is precision or site-specific farming. Precision farming uses information and control technology, such as the global positioning system (GPS), for acquiring information for pest eradication, fertilization, planting, and harvesting. Precision farming allows feedback and control on a small scale, with farmers able to determine trouble spots of small sizes and in scattered locations. Farmers gain the ability to treat small regions of a field differently and as needed, and not as one completely uniform tract of land.

One efficiency factor that has long been of importance to farmers is the genetic crop type. Farm crops have been selectively bred or engineered for a wide variety of traits. It is well known that the genetic crop type can greatly affect yield. Some genetic crop types are more suitable for drier soils, some for wet, some are more resistant to specific diseases or pests, some require a longer or shorter growing season, and some are more resistant to cold or frost. Other factors also may be selected or eliminated through a choice of a genetic crop type, such as height of the crop, amount of foliage, flavor or nutritional value of a crop, soil type and local soil conditions, etc. Yields can therefore be maximized if farmers can evaluate and control genetic crop performance on a small scale. However, traditional analysis of crop performance are confounded by genotype by environment (G×E) variance, which can prevent accurate predictions regarding the heritable component of crop performance. Accounting for such G×E variation would allow a farmer to make accurate predictions regarding which crop variety to use under any particular set of conditions.

Traditional evaluations of genetic performance for a crop such as corn are done on a fairly large-scale basis. There are many methods such as yield plots, strip trials, and side-by-side comparisons. The adoption of yield monitors and GPS technology provided a new method of tabulating yield data and calculating the average yield. Prior methods, for example, as described in U.S. Pat. No. 5,771,169, employed spatial referencing to analyze different treatment sections organized into geometric shapes or curves, and typically, polygons. Such structures are not amenable to direct comparisons with adjacently located regions of small enough scale to limit environmental variance, and thus, not optimally suited for the accounting of G×E variation. In particular, environment can vary significantly enough, even within a single field, such that crop performance information will be of little use due to G×E variation. Therefore, a method is needed that will allow comparisons between adjacently located, environmentally homogeneous regions. Such comparisons require a technique that will analyze samples that are equivalent in all aspects other than treatment. Using the prior art method, variations in field layout caused, for example, by planting pattern error, are not taken into account. This would lead to non-equivalent samples were a uniform cell-based comparative analysis attempted. Therefore, what is needed in the art is a method amenable to comparisons between adjacent cells and which takes into account field variations. In particular, what is needed is a pass-based method for the analysis of field characteristic data from adjacent field regions.

SUMMARY OF THE INVENTION

In one aspect, the current invention provides a method of determining a difference in the value of a first spatially-variable field characteristic, the method comprising the steps of: a) preparing a field, wherein the field comprises a first and a second crop test area; b) obtaining spatially-referenced field characteristic data for a designated region of the field, where the region comprises the first and the second crop test areas; c) designating the spatially-referenced field characteristic data to the first or the second crop test area; d) defining cells in the first and the second crop test area by designating length units within the crop test areas; and e) comparing the field characteristic data for a first cell from the first crop test area to an adjacent first cell from the second crop test area to identify a difference in the value of the field characteristic data.

The method may further comprise creating a visual representation of the difference in field characteristic data. The difference may be displayed using colors corresponding to the magnitude of the difference in the field characteristic data, or may be displayed using symbols, wherein the symbols correspond to the magnitude of the difference in the field characteristic data. Alternatively, the difference may be displayed alphanumerically. The step of creating a visual representation may comprise creating a graph. The data in the visual representation may be either spatially oriented relative to the designated region of the field, or may be non-spatially oriented relative.

The step of obtaining spatially-referenced field characteristic data may comprise measuring crop yield. There additionally may be a third, fourth or fifth crop test area, or still further, from about 6 to about 30 crop test areas, including 7, 8, 9, 10, 11, 12, 13, 14, 15, 16, 17, 18, 19, 20, 21, 22, 23, 24, 25, 26, 27, 28, and 29 crop test areas. Where desired, a larger number of crop test areas also could potentially be used.

The first and said second crop test areas may differ in potentially any aspect, the effects of which one desires to analyze. In one embodiment of the invention, the first and second crop test areas differ in the genotype of seed planted. Such a difference in genotype may comprise different species of crops, or alternatively, may comprise seed of the same species but of different varieties. Such varieties may differ in only a single locus, for example, where a transgene has been backcrossed into a particular inbred line. The varieties may be hybrid varieties, and may differ only in a single transgene that has been introduced into one of the parents of the hybrid. Alternatively, the varieties may be inbred varieties. Potentially any species may be analyzed with the invention, including wheat, maize, rye, rice, oat, barley, turfgrass, sorghum, sugarcane, millet, tobacco, tomato, potato, soybean, cotton, canola, alfalfa, sunflower, sugarbeets, peanuts, broccoli, carrots, peppers, raspberry, banana, apple, pear, forage grass and hay, and peach. In a preferred embodiment of the invention, the species is maize and the first and second crop test areas are planted with different hybrid varieties of maize. In another embodiment, the species is soybean.

In addition to differences in crop variety or genotype, the crop test areas may differ in the method of cultivation. Such differences may include application of plant nutrient factors or soil amendments, application of insecticide, or application of herbicide.

The step of obtaining spatially-referenced field characteristic data may comprise measuring any information for which one wishes to compare, for example, a crop performance variable. Crop performance variables include measurements of grain moisture, protein content, oil content, starch content, plant height, stalk thickness, canopy density or plant stand. The step of obtaining spatially-referenced field characteristic data also may comprise measuring an environmental condition variable. Such environmental condition variables include soil pH, soil tilth, soil structure, soil moisture, soil fertility, soil type, soil compaction, disease infestation and pest infestation. The pest infestation may include insect infestation or nematode infestation. Still further, the step of obtaining spatially-referenced field characteristic data for a designated region of the field may comprise obtaining data for an environmental condition variable and for a crop performance variable.

In one embodiment of the invention, the step obtaining spatially-referenced field characteristic data comprises using a yield monitor linked to a georeferencing means. Any suitable georeferencing means may be used. Preferably, the georeferencing means comprises GPS. Alternatively, the step of obtaining spatially-referenced field characteristic data comprises using remote sensing or remotely sensed data. Still yet another technique that could be used to obtain spatially-referenced field characteristic data comprises using precision agricultural techniques. The step of designating preferably comprises assigning a pass of a combine to the first or said second crop test region.

The method may further comprise calculating an average of the spatially-referenced field characteristic data for the cells. This average, or other appropriate cell field characteristic data statistics may be used to identify outlier cells through comparisons to the average, whereby the outlier cell is not compared to an adjacent cell. In one embodiment of the invention, the comparison to the average is made based on the standard of deviation or number of data points of the outlier cell relative to the average.

The step of comparing may comprise calculating a quantitative difference in field characteristic data between a first cell and an adjacent first cell. In one embodiment of the invention, the calculating comprises subtracting the value of the field characteristic data for the first cell from the value of the field characteristic data for the adjacent first cell.

A correlation also may be calculated between an environmental condition variable and the crop performance variable. This will provide information regarding the performance of a crop under various conditions, thus allowing farmers to maximize crop production. Such a correlation may be calculated, for example, by regressing the environmental condition variable relative to the crop performance variable. Environmental condition variables that may be analyzed in this way include soil pH, soil moisture, soil fertility, soil type, soil compaction, disease infestation and pest infestation. The pest infestation may include insect and nematode infestation.

In another aspect of the invention, a system is provided for determining a difference in a first spatially-variable field characteristic, wherein the system comprises a) a first input device for receiving spatially-referenced field characteristic data; b) a second input device for receiving user commands; c) a processor unit communicating with the first and the second input device to designate the field characteristic data to a first crop test area or a second crop test area according to the user commands, to define cells from said first crop test area or said second crop test area based on the user commands, and to calculate a difference between a first cell from the first crop test area and a first cell from the second crop test area; and d) an output device for displaying the difference.

In particular embodiments of the invention, the first input device may be selected from the group consisting of a keyboard, an optical or magnetic disk drive, a touch screen, a voice activated input device and a modem. In one embodiment of the invention, the input device is a disk drive. In further embodiment of the invention, the second input device may be selected from the group consisting of a keyboard, an optical or magnetic disk drive, a touch screen, a voice activated input device and a modem. In one embodiment of the invention, the second input device is a keyboard.

Any suitable output device may be used with a system of the invention, including a color monitor, a monochrome monitor and a printer. In one embodiment of the invention, the output device printer.

In yet another aspect, the invention provides a system for determining a difference in a spatially-variable field characteristic, wherein the system comprises: a) a first input means for receiving spatially-referenced field characteristic data; b) a second input means for receiving user commands; c) a processing means communicating with the first and the second input device to designate the field characteristic data to a first crop test area or a second crop test area according to the user commands, to define cells from the first crop test area or the second crop test area based on the user commands, and to calculate a difference between a first cell from the first crop test area and a first cell from the second crop test area; and d) an output means for displaying the difference. In one embodiment of the invention, the system further is defined as comprising a processing means for calculating a correlation between the difference and an environmental condition variable.

In particular embodiments of the invention, the first input means is selected from the group consisting of a keyboard, an optical or magnetic disk drive, a touch screen, a voice activated input device and a modem. As used herein, a modem includes any device capable of receiving data from a type of data transmission line, such as, for example, a fiber optic cable, a standard phone line, and a T1 line. In one embodiment of the invention, the first input means is an optical or magnetic disk drive. The second input means may, in particular embodiments of the invention, be selected from the group consisting of a keyboard, an optical or magnetic disk drive, a touch screen, a voice activated input device and a modem. In one embodiment of the invention, the second input means is a keyboard.

The output means comprise any device suitable for displaying the calculated difference, including a color monitor, a monochrome monitor and a printer. In one embodiment of the invention, the output means is a printer.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 1A: In the instant invention, spatially-referenced data is specifically assigned to a particular crop test area based on the actual layout of a field. FIG. 1B: In the prior art method, data is sampled at periodic locations independent of field layout, resulting in data overlap. This also results in larger areas of comparison, tending to smooth out differences and thereby, limit the utility of the data.

FIG. 2A: In the current invention, crop test areas can be assigned based on field layout thereby allowing direct comparison of adjacent portions of different crop test areas. FIG. 2B: The prior art method failed to consider field variations, for example, due to planting pattern errors, thereby leading to crop test areas which are not comparable to adjacent test areas, and hindering accurate comparisons of adjacent cells.

DESCRIPTION OF ILLUSTRATIVE EMBODIMENTS

The current invention seeks to overcome limitations in the prior art by providing a technique for the cell (length unit) based comparison of field characteristics. Through use of comparisons, the current invention better characterizes genotype by environment (G×E) interaction by allowing a smaller area of comparison. The invention also represents an advance over the prior art in that it can be used to analyze crop data in a non-uniform grid pattern. The method allows production of data maps for commercial agricultural production fields which look unlike conventional maps. This is because previous maps include interpolated data that are typically calculated from larger regions, which can result in less sensitivity.

Figure 1B:
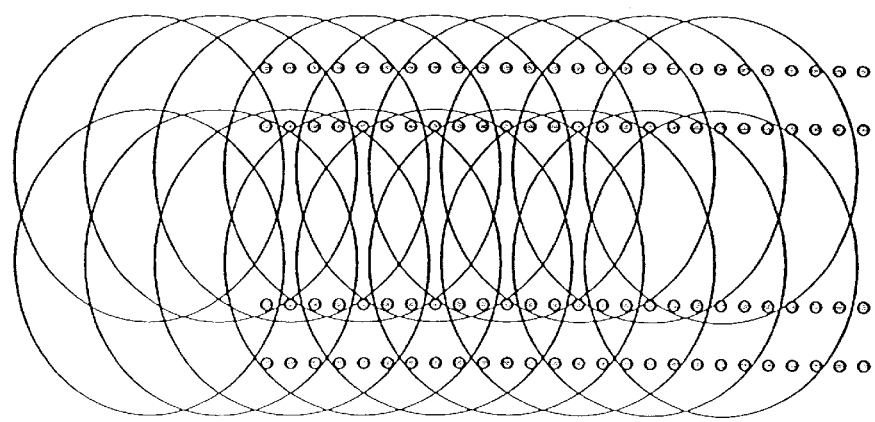
FIGS. 1A, 1B: Comparison of data sets for the current invention relative to the prior art.
Figure 1A:
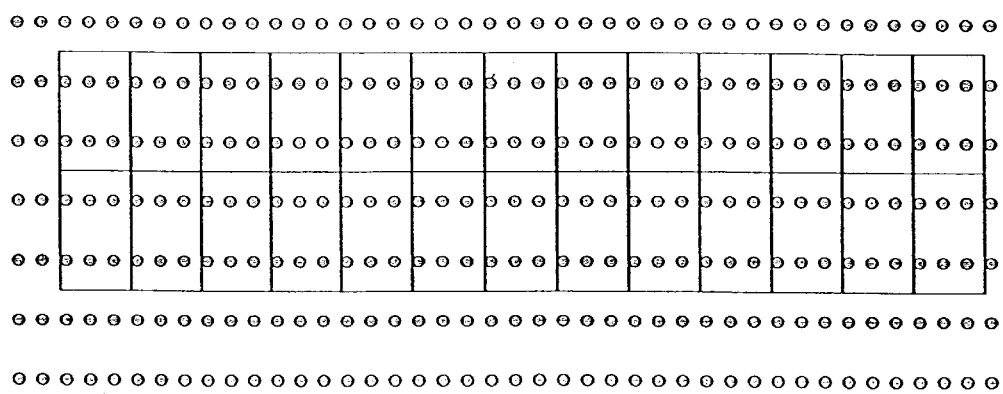
Figure 2B:
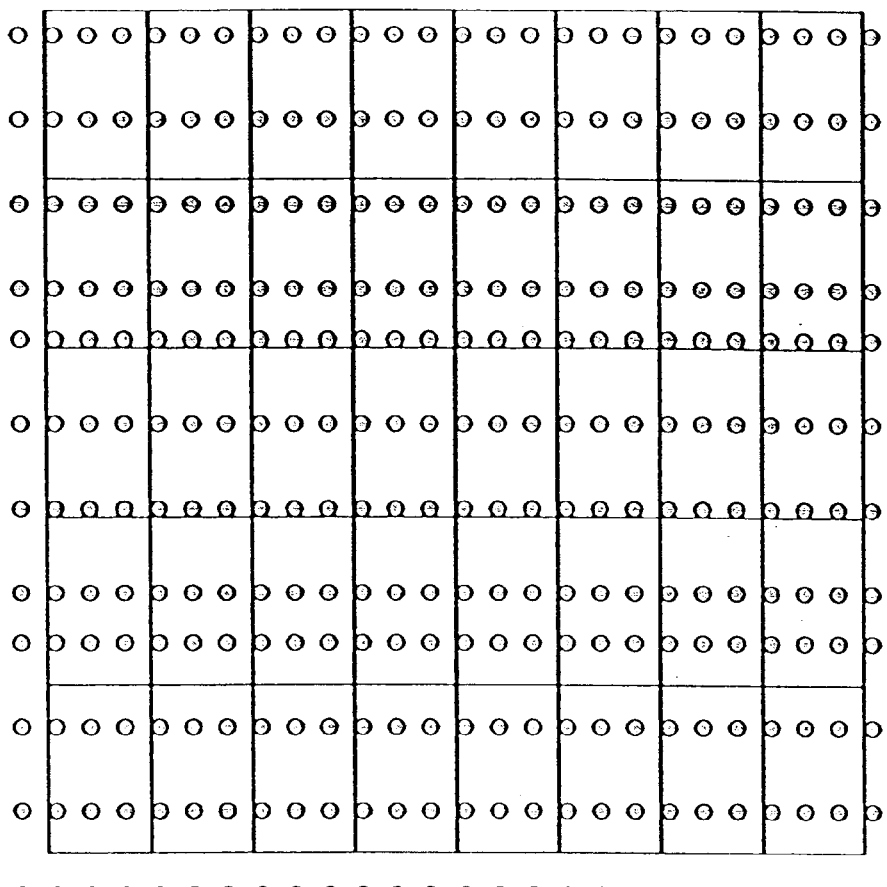
FIGS. 2A, 2B: Demonstration of why prior art methods will not calculate cells.
Figure 2A:
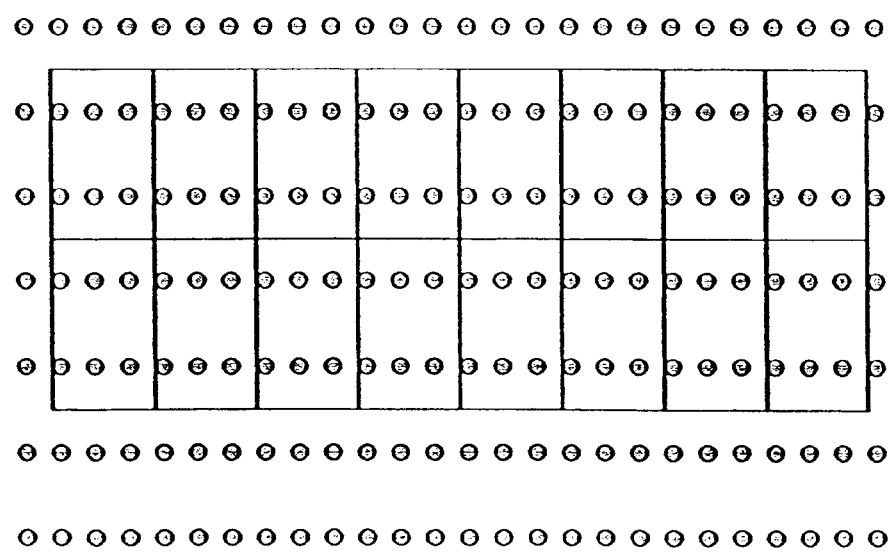

The distinction and benefits of the current method relative to the prior art can be seen in FIG. 1. The current method comprises designation of specific cells in which sampled data does not overlap (FIG. 1A), providing a more accurate analysis. The prior art method (FIG. 1B), involved periodic sampling of results, yielding an overlap in data points, thereby introducing the potential for error due to extrapolation. The current method, however, allows individual passes of a combine to be designated to particular crop test areas, which in turn can be divided into cells (FIG. 2A). Prior art methods do not allow accurate calculation of cells because data is analyzed independently of the actual field layout, which can vary from even the most carefully executed plantings. This prevents accurate calculation of cells corresponding to crop test areas, as adjacent crop test areas may not be equivalent in the sample being analyzed or even the treatment sampled (FIG. 2B).

The current method allows division of a field into designated blocks, for example, 20-foot cell blocks, thereby allowing a side-by-side comparisons which give a high degree of accuracy. By allowing such comparisons, the invention allows, for the first time, significant reductions in variance caused by genotype-by-environment interaction, thereby allowing observation of the effect of various field inputs, such as farming inputs or type of crop planted. Such avoidance of G×E interaction is a key advantage of the invention. Most producers have had the experience of hybrid A yielding more than hybrid B in one field, and hybrid B yielding more than hybrid A in another field, all in the same year. This is typically due to a G×E interaction. Seed companies have historically tried to generalize the positioning of their hybrids; one hybrid for this type of soil and another hybrid for that type of soil. The philosophy behind conducting comparisons of crop performance relative to various inputs is to gain knowledge and understanding of product performance and provide the most profitable seed use recommendations for farmers. This also provides a solid platform for the producer to evaluate different crop varieties on an even playing field. However, without elimination of the G×E variation, data regarding crop performance is of limited utility. Through use of the instant invention, such variation is essentially eliminated.

I. Exemplary Detailed Instructions for Processing Field Data.

Figure 3A:
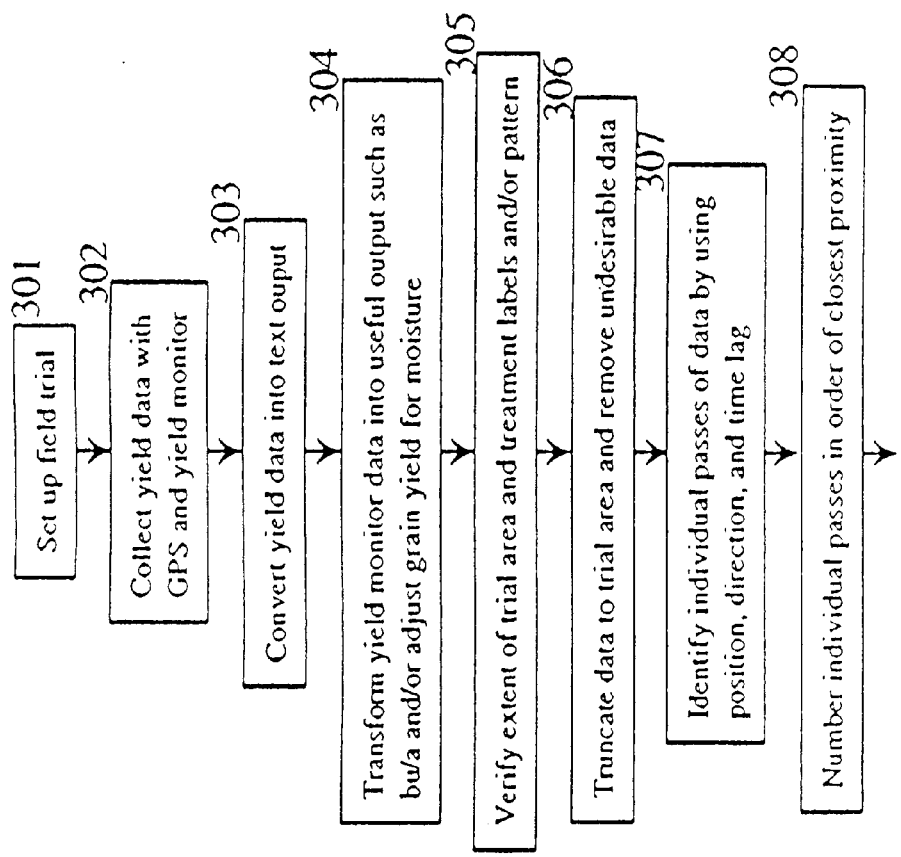
FIGS. 3A, 3B: Detailed flow chart of method for determining the difference in value of a spatially-variable field characteristic. The descriptions assume yield is selected as the spatially variable field characteristic.
Figure 3B:
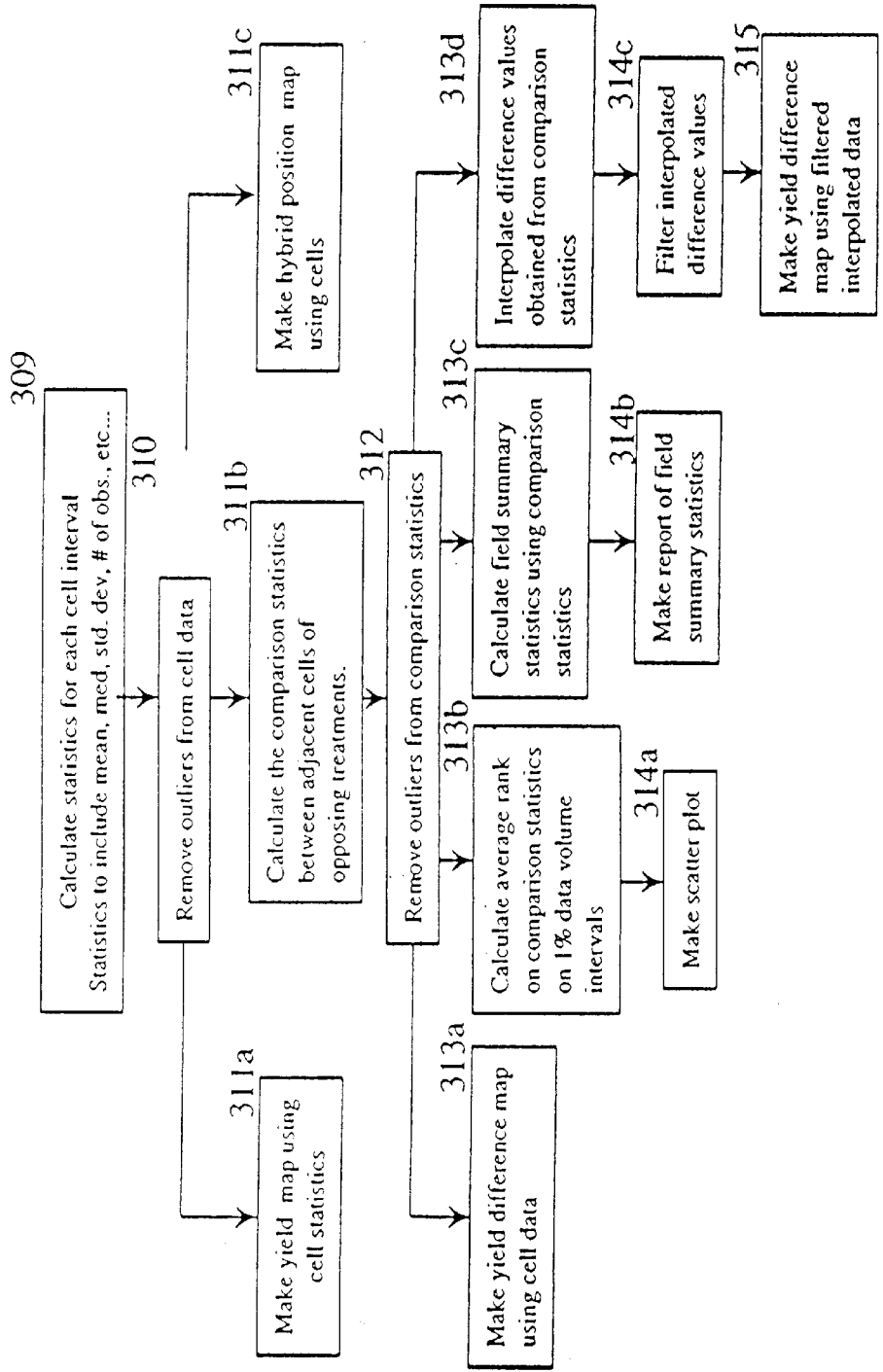

An exemplary flowchart for processing of data according to the instant invention is provided in FIGS. 3A, 3B. The steps are provided for illustrative purposes and not meant to be limiting in any way. As indicated, in step 301, a field is set up for the desired comparisons between first and second crop test areas. Generally, these crop test areas will differ for a particular trait or treatment the effect of which it is desired to be determined. Exemplary differences include the type or genotype of crop planted, or different farming practices, although potentially any difference between the test areas could be analyzed.

Typically, after a field has been prepared, spatially-referenced field characteristic data is obtained. This may comprise several layers of data. For example, the field characteristic data may simultaneously comprise measurements of an environmental condition variable and a crop performance variable. In this way, crop performance can be measured as a function of the environmental conditions, giving valuable new information that will allow a farmer to maximize yields. Where a crop performance variable is being measured, typically a suitable period of growth will be allowed for the crops generally to mature, such that the yield and grain moisture or other such traits can be measured.

The step of obtaining spatially referenced field characteristic data (e.g., steps 301–304) typically requires transforming raw data in the appropriate units (such bu/a@ a given % moisture) into a format (such as *.txt or *.dbf) that can be imported into a geographical information system (GIS) (steps 303 and 304), such as ArcView (Environmental System Research Institute, Inc., Redlands, Calif.). The inventors have found that converting crop performance data, such as yield, into a text format works well with the invention.

Field characteristic data may comprise any appropriate characteristic selected by the user of the invention. For example, the field characteristic data may comprise an environmental condition variable, including information concerning soil type or pH (to evaluate effects of soil variability), information concerning watering or rainfall levels (to evaluate moisture dependency and drought hardiness), information concerning pest infestations (to evaluate pest resistance), information concerning fertilizer levels (to evaluate fertilizer dependency), and information concerning disease infestations (to evaluate disease resistance). Alternatively, the field characteristic data may comprise crop performance data such as moisture content, protein content, oil content, starch content, plant stand or yield.

After obtaining spatially-referenced field characteristic data, it is designated to the first or second crop test area. Preferably, the appropriate datum and projections for the region from which the data has originated are set for the GIS (step 305). The data is then displayed using any labels (such as load or hybrid labels) provided to identify treatment patterns to determine the extent of the test area and verify that the labels pertaining to treatments are accurate. All of the data points located outside of the test area are then removed. In steps 305 and 306, the data is displayed so that the yield variation can be observed and the data from the edge of the field can be removed to avoid any data quality issues. One such way in ArcView is to create a shapefile and edit out the undesirable data.

In steps 307 and 308, from the edited data, a pass number is assigned to each data point. One such way is to rank the individual data points based on the time of acquisition. The minimum, maximum, and range of both latitude and longitude are calculated for the truncated data range. Each point is expressed as a percentage of the Northing and Easting of the test area. In addition, the time interval between each given point and its preceding point are also calculated. For gaps as large as 30/1000000's of a longitude or latitude shift (depending upon direction), a new potential pass is identified and the number of observations in the potential pass is calculated and is then cross checked with the number of observations in other passes. When the number of observations is significantly different between passes, the relative location and time lag difference is used to further correct the pass identification. After the pass identification is done, the average location in either latitude or longitude for each individual pass is used to determine the relative position of each pass based on Northern or Eastern position, depending on test area orientation. Then each pass is relabeled according to the new relative positions.

Cells are then defined within the crop test areas. First, to calculate cells, the data are preferably processed by pass (step 309). Within a pass, the determination of the actual length is subjectively predetermined based upon data quality and type of equipment used to generate the data. For example, for typical yield monitor data, the length may be 20 ft. Depending upon the direction of data collection, the data is subsetted based upon the latitudinal and/or longitudinal spatial referencing of the data. For example, a north-south oriented pass would be grouped by increments of the latitude in increments of 20 ft. For this same example, the range of data subsetted for each pass would be for the same increments of latitude which permits a more accurate side-by-side comparison. One such way to subset the data in this manner is to perform a database extraction for each pass, for all the data in the range of the specified latitude. This process would then be repeated for each cell for every pass.

Once a cell has been subsetted, the data summary statistics can be calculated on each subset. This would be statistics such as the mean, median, maximum, minimum, standard deviation, and number of observations in each cell. These statistics could be calculated for the latitude, longitude, elevation, grain yield, and grain moisture.

Outlier cells can then be removed by examining the summary statistics for each cell (step 310). Example criteria can be a wide data range, too few or too many data observations, or too large a standard deviation. A step may also be used to ensure good data by identifying outlier data which is outside of a normal field characteristic data range. Outlier data is an abnormal fluctuation in a variable which can undesirably affect statistics. The field characteristic data of different cells, or averages thereof, can be compared to ensure that measurements have not been largely affected by other factors, allowing highly deviating cells to have some or all yield data points thrown out or normalized. In this manner, large data fluctuations due to confounding factors may be neutralized. Such factors may include, for example, planter problems where seeds were planted thinly or not at all, commonly experienced yield variations around the perimeter of a field, problems with over or under-fertilization, flooding, wind damage, yield monitor errors such as changes in harvester speeds, lodging of the crop in the harvester, wind damage, etc. Field characteristic data deviation statistics may be useful in spotting such problems, as the standard deviation may indicate an outlier data point if the standard deviation exceeds a predetermined amount. This may entail removing or discarding a single yield data point, multiple data points, or data from an entire cell. Alternatively, the outlier data may be normalized by replacing the outlier with data such as a cell average, etc.

In step 311a, to make a yield map, the data is quantiled into six categories and a fixed color range is used based upon the six categories, using mean latitude, longitude, and grain yield (or other field characteristic data) from the summary statistics of the cell. The datum and projection are set so the maps are printed out using UTM (Universal Trans Mercator) for the appropriate zone for the data of interest.

In step 311b, the calculation of the comparison statistics is done using the summary statistics for each cell. The cells of opposite but adjacent treatments are compared with one treatment consistently being subtracted from the other. In addition to the difference between, for example, grain yield and grain moisture, the minimum and maximum number of observations, and the maximum standard deviation of the cell is compared. Cells are considered adjacent for cells with a similar latitude or longitude of unique passes that are closest in proximity for the different crop areas used for a given comparison. This may or may not be immediately adjacent passes. For example, test areas may involve test areas A, B, and C, each planted in that order. To compare A and C would require one to ignore pass B even thought it is the closest proximity. The step of defining cells may be performed at any time after crop test areas are designated. For example, cells can be drawn after gathering treatment-assigned data at harvest.

In step 311c, the hybrid position map is made using the summary statistics from the cell. The latitude, longitude, and hybrid label are used to generate the map. The datum and projection are set so the maps are printed out using UTM for the appropriate zone for the data of interest.

In step 312, the outliers from the summary statistics are removed if they have data calculated from the summary statistics that meet a subjective criteria. Such criteria might include, for example: less than two observations in a cell, a standard deviation greater than 15 bu/a for one of the cells, one cell contains more than 10 observations, and a yield difference greater than 100 bu/a. In step 313a, the yield difference map can be generated using the comparison statistics from step 311b. Using the latitude, longitude, and variable of interest (such as yield difference), a map can be generated. The legend is grouped into six categories of 0–5,5–10, 10+ bu/a for the hybrid that yielded higher. The datum and projection are set so the maps are printed out using UTM for the appropriate zone for the data of interest.

In step 313b, all of the comparison statistics are ranked from the lowest to highest grain yield (the grain yield is the mean of the mean grain yield of both cells being compared). Both the average grain yield and yield difference data are then averaged in 1% increments of the total number of observations. The data containing negative yield differences is converted into positive values.

In step 313c, the average yield of each hybrid is determined by calculating the mean of all the cells of each hybrid independently. The yield difference is the difference between the average yield of each hybrid as calculated from the cell. The frequency of hybrid yield advantage is determined by calculating the percentage of the comparison statistics that fall into each of the six yield difference categories used to generate the yield difference map.

In step 313d, the interpolated yield difference map is generated by using the comparison statistics. The yield difference values are interpolated using inverse distance weighted to the first power using the 20 closest observations.

In step 314a, a scatter plot of the yield vs. hybrid yield advantage graph is generated using the mean rank data from step 313b. The "X" axis is the mean yield and the "Y" axis is the hybrid advantage. To generate the scatter graph with two legend types, two y columns of data are generated. The positive yield difference for each hybrid are placed into their respective columns.

In step 314c, the interpolated data is then filtered depending upon the data, but typically a 5×5 mean value kernel would be used.

In step 315, the filtered yield difference data is then grouped into the same six data ranges in step 313a with the same colors. The datum and projection are set so the maps are printed out using UTM for the appropriate zone for the data of interest.

II. Exemplary Process for Analyzing Spatially Referenced Data

In one embodiment, the current invention provides a method of determining the value of a first spatially-variable field characteristic. In a preferred embodiment, the method comprises the steps of a) preparing a field, where the field comprises a first and a second crop test area; b) obtaining spatially-referenced field characteristic data for a designated region of the field, where the region comprises the first and said second crop test areas; c) designating the spatially-referenced field characteristic data to the first or said second crop test area; d) defining cells in the first and second treatment sections; and e) comparing the field characteristic data for a first cell from the first crop test area to an adjacent first cell from the second crop test area.

All of the comparison statistics (the mean yield and the yield difference) are calculated from the cell data from the entire truncated field trial area are ranked based on the average yield. From the rank, data are averaged into 1% increments (of the data population) for both yield and yield difference. The yield difference data is then transformed into positive yield increments relative to the hybrid with the higher yield. A scatter plot is then generated with the average grain yield on the X axis and the positive yield difference on the Y axis. This same process can be performed for data other than yield or yield difference.

Each of the cells are assigned a crop test area code from Id, flags, hybrid label or additional supplemental data. A pass is identified by ranking the data in sequential order based on time of acquisition and looking for gaps in time and relative position of the data point relative to the other points significantly different to identify a new pass. The passes are ordered from East-West or North-South (e.g., Easting or Northing), depending upon the row direction. More specifically, the individual data points are ranked in sequential order based on the time of acquisition. The minimum, maximum, and range of both latitude and longitude are calculated for the truncated data range. Each point is expressed as a Percentage of the Northing and Easting of the test area. In addition, the time interval between each given point and its preceding point are also calculated. For gaps of 30/1000000's of a longitude or latitude shift (depending upon direction), a new potential pass is identified and the number of observations in the potential pass is calculated and is then cross checked the number of observations in other passes. When the number of observations is significantly different between passes, the relative location and time lag difference is used to further correct the pass identification. After the pass identification is done, the average location in either latitude or longitude is used to re-label the passes in order based on North or Eastern Position.

Cells are calculated by adjusting the pass-length to contain the same Latitude range for north south rows, or longitude for East-West rows, or a calculated latitude-longitude position for rows not close to a N-S, E-W orientation for each pass for each pass length calculation.

One important advance of the current invention is that it allows certain environmental condition variables to be correlated with crop performance. For example, pest infestation could be correlated with the crop performance of two different crop varieties planted in first and second crop test areas. This will provide information as to the level of pest resistance or susceptibility of a particular variety. Such a correlation can be made by regressing the environmental condition as determined at the point location of the cell to the crop performance variable.

The results of any comparisons made in accordance with the invention may be visually represented in any way that effectively communicates the results. A particularly useful method for displaying data comprises use of different colors representing different ranges of data. For example, the colors red, orange, yellow, green, cyan, blue and violet may represent different magnitudes of differences between two treatments in adjacent cells. For example, each color may identifies a hybrid for each pass. The area tested should be at least 5 acres, although 40 or more are preferred.

A. Crop Test Area Layout

Side-by-side hybrid comparisons are easiest to set up for growers who operate a header that harvests exactly half the rows of the planter (e.g., 12-row planter and 6-row corn head). Exemplary planting patterns for crop comparisons are given in Table 1.

TABLE 1

Planter Configurations For Split-Planter Trials

| Planter Rows | Corn Head Rows | Hybrid Planter Box Location | | | Notes |
| --- | --- | --- | --- | --- | --- |
| | | Hybrid A | Hybrid B | Hybrid C | |
| 6 | 4 | Right 4 rows | Left 2 rows | | Alternate hybrids half-way across fields |
| 6 | 6 | Right 3 rows | Left 3 rows | | |
| 8 | 4 or 8 | Right 4 rows | Left 4 rows | | |
| 8 | 6 | Right 6 rows | Left 2 rows | | Alternate hybrids half-way across fields |
| 12 | 4 | Right 4 rows | Middle 4 rows | Left 4 rows | Allow all 3 hybrids to be in the middle |
| 12 | 4 | Right 8 rows | Left 4 rows | | Alternate hybrids half-way across fields |
| 12 | 6 or 12 | Right 6 rows | Left 6 rows | | |
| 12 | 8 | Right 8 rows | Left 4 rows | | Alternate hybrids half-way across fields |
| 16 | 8 | Right 8 rows | Left 8 rows | | |
| 16 | 12 | Right 12 rows | Left 4 rows | | Alternate hybrids half-way across fields |
| 24 | 8 | Right 8 rows | Middle 8 rows | Left 8 rows | Allow all 3 hybrids to be in the middle |
| 24 | 8 | Right 16 rows | Left 8 rows | | Alternate hybrids half-way across fields | represent a range of 5 bu/acre in difference between a first treatment cell and an adjacent second treatment cell. Alternatively, different ranges may be represented by alphanumeric characters, symbols or different light intensity levels.

As each cell is georeferenced and defined within a given treatment section, the visual representation of cell-based comparisons can be spatially oriented relative to the designated test area within the field. This allows, for example, the observation of how a particular treatment affects crop performance in a section of the field, potentially allowing the farmer to vary inputs to the field or portions thereof. Alternatively, the current invention provides methods for the non-spatial representation of data. This allows, for example, the efficient representations of correlations between treatments and/or environmental conditions and crop performance. The display can include multiple layers of data, for example, data relating to the crop performance variables yield, and moisture, in association with the environmental condition variable soil pH.

III. Split-Planter Trials

Split-planter trials represent an efficient means by which the invention can be used to analyze the performance of different crop varieties within a single field. In this way, the invention allows one to avoid genotype by environment (G×E) interaction, which can confound results. Potentially any two varieties of a crop could be compared. In this example, two corn hybrids were compared. Because of the way a corn head lines up of with planter rows, the most accurate results frequently occur with corn. The yield data is collected with a GPS-equipped yield monitor in a way that Once seed is loaded in the planter, planting across the field is carried out as normal. The planting pattern is clearly identified by separating each hybrid with labeled flags, stakes or other markers that will be easy to find during harvest.

For example, if planting with a 12-row planter and planting to harvest with a 6-row corn head, the left six rows of the planter are filled with hybrid B and the right six with hybrid A. Hybrid A is marked as the first six rows along the road, and the next 12 rows as hybrid B. This makes a 12-row repeating pattern across the field.

B. Obtaining Data

For harvesting, it is important to have the yield monitor properly calibrated for accurate results. Weighing a few passes of each hybrid to double-check the yield monitor can reassure accurate data representation. Proper identification of the data is also important. "Loads" or "flags" are terms used to segregate electronic yield data. Adjacent comparison hybrid strips should be harvested in the same direction, if at all possible.

Side by side hybrid comparisons are extremely easy to facilitate when using a corn head that harvests exactly half the rows of a planter. Spatially-referenced crop performance data is then obtained for the field by use of, for example, Ag Leader or CaseAFS yield monitors. A *.yld file is collected from these apparatus, e.g. an exact copy from data card. Using a GreenStar yield monitor (commercially available from Dakotaland Equipment, Madison, S.Dak.), the desired file is exported in a *.txt format from the JDMap. This file may need to be compressed to fit on one floppy, PMCIA card, SRAM, email, ZIP drive, JAZ drive, or Bernoulli drive Once spatially-referenced crop performance data is obtained, this information is stored in computer-readable form. The data is then converted into a file type readable to the software used, for example a *.yld file such as those obtained using Ag Leader or CaseAFS yield monitors. Such data can be stored using any suitable memory type, such as PCIA or SRAM. The data can then be loaded into a computer system, such as a personal computer or workstation, for analysis.

Although more time-intensive, relatively small amounts of data may be transferred to a computer by manually entering data from paper into computer. Data also may be transferred from a data collection system via storage media such as magnetic or optical disks or tapes. Image data, such as data represented within photographs, may be inputted using a digitizer or scanner connected to the computer. Such data may be georeferenced using GPS, or, for example, using landmarks of known location. A digitizer creates a digital image which may be referred to as a bit map.

A set of spatially-referenced data may be comprised in the form of a digital map, or a layer of data. This may be implemented using a database (e.g., a geographical information system (GIS) database), wherein each row represents a characteristic data point taken at a location in the field. For example, a layer having 5000 data points is represented by a table having 5000 rows. Columns of information are associated with each data point. For example, columns may include yield data (bu/acre), moisture content, and the longitude and latitude coordinates at which the data points were sampled. Additional columns (not shown) may include flow rate, GPS time, combine serial number (S/N), field identification, type of grain (e.g., corn), and altitude. The data may be comprised as, for example, a yield layer. Structures may be used to store other layers of data. For example, a pH layer may include a row for each data point and columns for pH, longitude and latitude.

By obtaining spatially referenced field characteristic data corresponding to an environmental condition variable and using this data to create a correlation with crop performance, farmer inputs could be changed to maximize crop performance. For example, two adjacent crop test areas could be treated with different fertilizer applications. The invention may then be used to identify a difference between two cells for a particular crop performance variable. Because the invention measures adjacent cells within the crop test areas, confounding treatment by environment interactions will be better characterized, allowing accurate measurements of, for example, the effects of fertilizer application to be made. In this way, the environmental component of response to fertilizer treatment can be better recognized. This would then allow farmers to optimize inputs for maximum crop performance. Any additional environmental condition variables could also be correlated to the crop performance, for example, certain soil conditions such as pH, compaction, or moisture, or pest or disease infestation. This would allow farmer inputs to be maximized relative to the environmental conditions prevalent within a field or certain subsections of a field.

C. Comparison of RX490 and RX587

Figure 4:
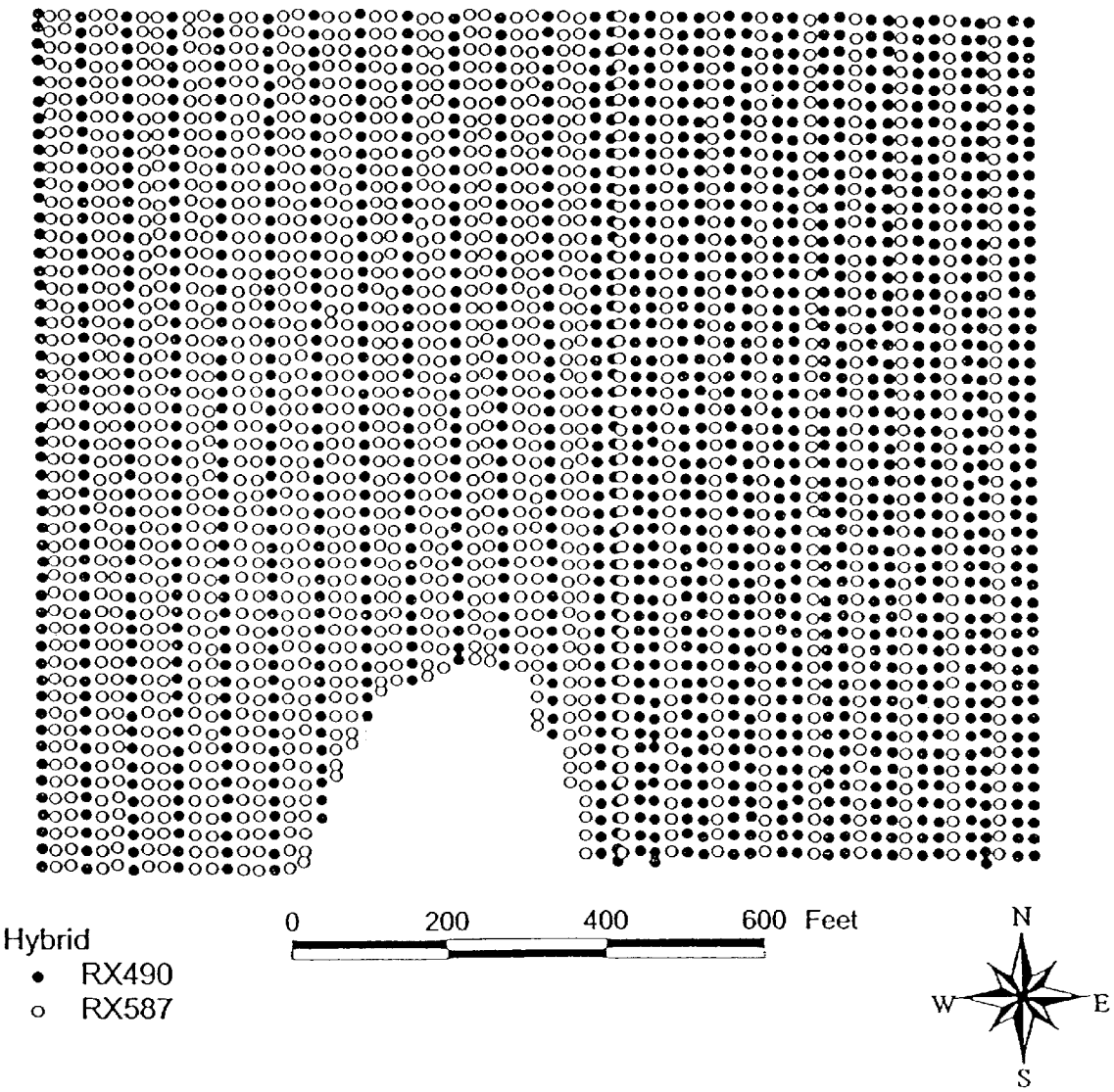
FIG. 4: Map of crop test areas. Shaded circles represent areas planted with hybrid variety RX490. The remaining circles were planted with hybrid RX587.

The invention was used to analyze differences in crop performance in a selected field between the Asgrow brand hybrids RX490 and RX587. A map showing the position of the hybrids in the field is given in FIG. 4. Raw data from the north and south ends of the field was excluded from the analysis to maximize data quality. Each point shown represented the average of all the yield measurements within a 20-foot length for each combine pass.

The raw data was processed according the method as described in Section I, above. Each point reflected a calculation between the 20-foot cells of the adjacent hybrids. If no data was present for either 20-foot cell, a calculation was not performed. The grain yield for all calculations was adjusted to 15.5% moisture content. The results of the analysis are given in FIG. 5.

Figure 6:
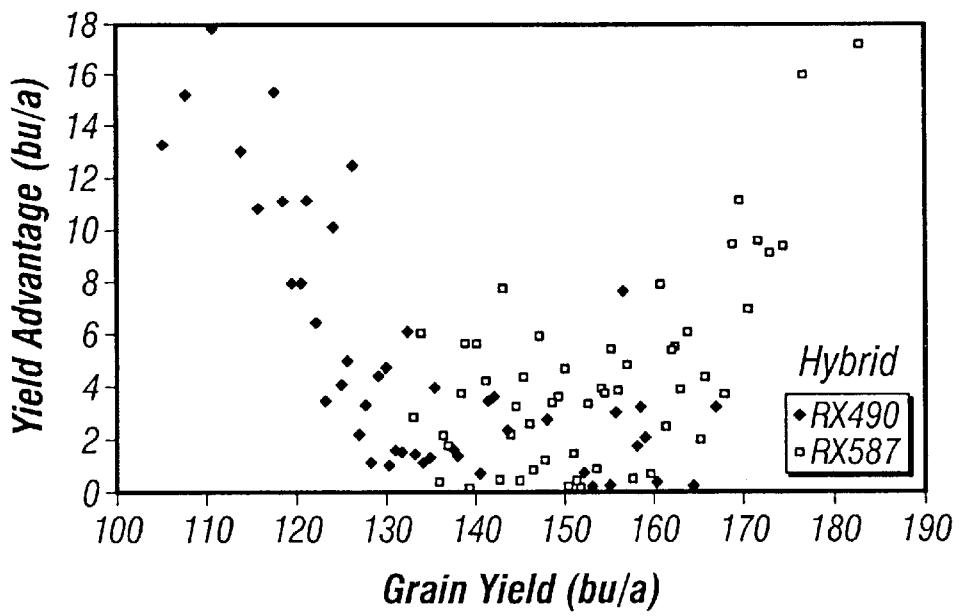
FIG. 6: Non-spatial representation of the data provided in FIG. 6. The figure shows the relative yield of each hybrid as a function of the yield level of the field. Each point represents about 1% of the field. The results indicate that hybrid RX587 provided a yield advantage in the higher yielding portions of the field, while RX490 performed better in the lower yielding portions of the field.

A non-spatial representation of the data obtained was prepared as described in Section II (FIG. 6). The non-spatial representation is the pattern between hybrid advantage and yield level of the field. Each point represents about 1% of the field. The yield differences were averaged in consecutive increments based on the yield in the field. The results from this suggest that at higher yielding areas of the field, there tended to be a yield advantage for RX587. At lower yielding areas of the field, there tended to be a yield advantage for RX490. The non-spatial representation is particularly valuable for analyzing crop performance difference relative to the total value of the crop performance variable or other variables.

Figure 5:
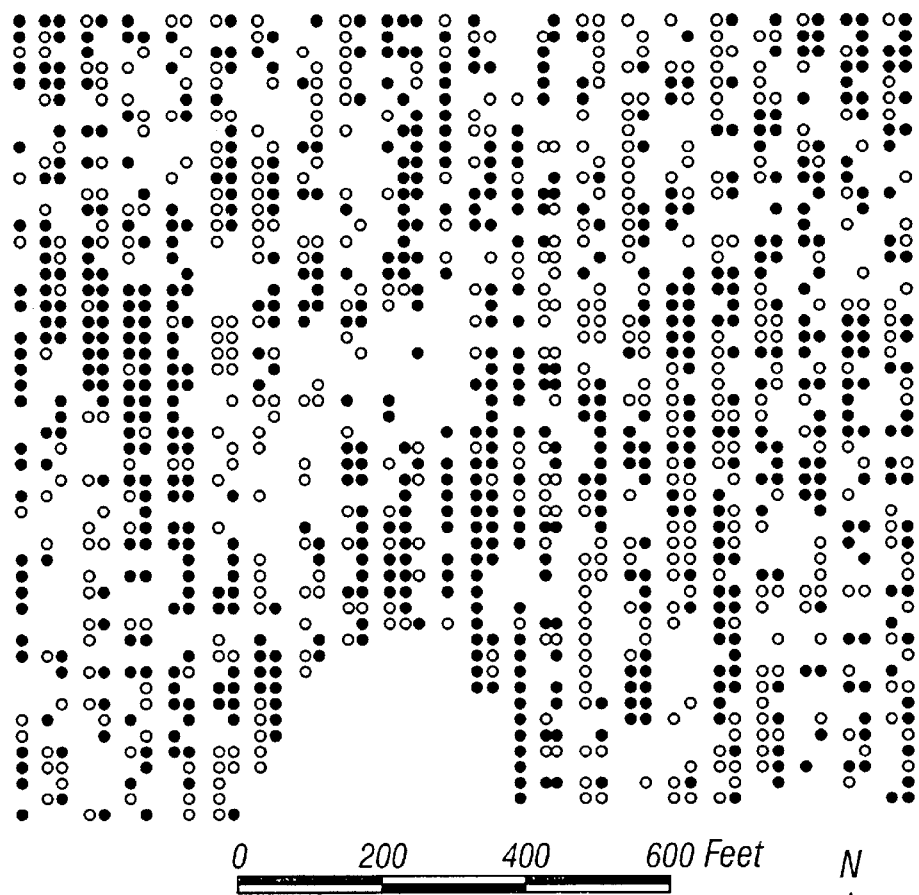
FIG. 5: Yield difference map showing difference in yield crop performance between hybrids RX490 and RX587. Each point reflects the difference between two adjacent 20 foot cells. If no data was present for either cell the difference calculation was not made. The grain yield was calculated using an adjusted 15.5% moisture content. The magnitude of difference is given according to shading of points, as indicated in the legend.

An interpolation of the data of FIG. 5 was then prepared. Because the interpolation and smoothing can cause errors and create patterns that could be misleading it is generally used only for appearance for our purpose. All hybrid comparison calculations were performed before this process. Interpolations have typically been used by others because of the lack of availability in the art of a suitable technique for making comparisons of adjacent test areas.

IV. System for Analyzing Spatially-Variable Field Characteristics

Figure 7:
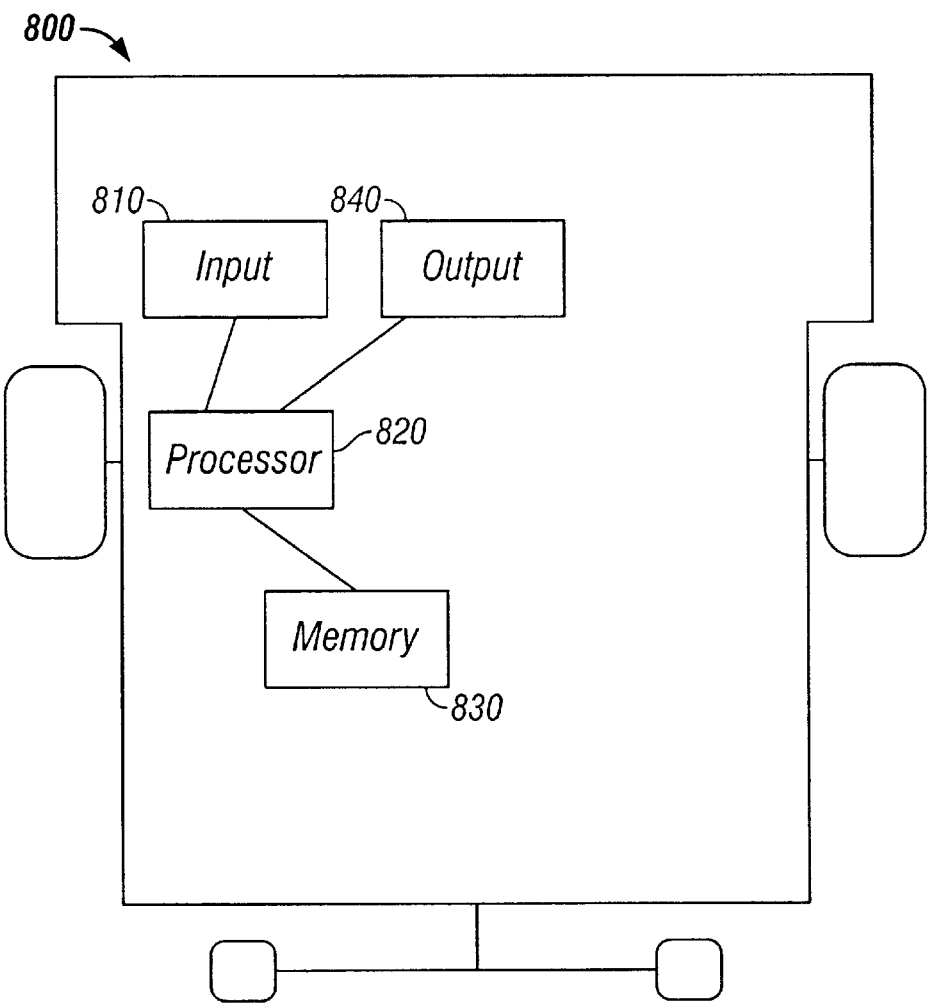
FIG. 7: System for carrying out analysis on spatially-referenced field characteristic data.

The current invention includes a system for determining the difference in a first spatially variable field characteristic between cells. FIG. 7 shows a preferred system 800 for performing the methods of the invention, and includes a processor 820, an input device 810, an output device 840, and a memory 830. The system uses spatially-referenced data obtained through the input 810. The spatially referenced data is obtained from an appropriate means for obtaining field characteristic data, such as a yield monitor operably linked to a georeferencing means, for example, a GPS system. Exemplary yield monitor systems are the Ag Leader yield monitor commercially available from Ag Leader Technology, Ames, IA, and the CaseAFS yield monitor, commercially available from the Case Corporation, Racine, Wis. Suitable yield monitors which may be used with the invention are well known to those of skill in the agricultural arts and include for example, those described in U.S. Pat. Nos. 5,318,475, 5,480,354, 5,779,541, each of the disclosures of which are specifically incorporated herein by reference in their entirety.

Alternatively, manual observations or remote sensing (U.S. Pat. No. 5,764,819, the disclosure of which is specifically incorporated herein by reference in its entirety) could be used to obtain the spatially-referenced field characteristic data. In the invention, it is only necessary that the field characteristic data be spatially referenced such that it can be assigned to a particular crop test area within a designated region of the field. In particular, such data may be assigned to a particular pass. In this way, multiple types of data can be assigned to the same pass, allowing multiple comparisons or correlations to be made. For example, it may be desirable to calculate a correlation between soil type or another environmental condition in a given crop test area to crop performance in the test area.

The input is connected to a processor 820, which in turn is linked to memory 830 and output devices 840. The processor may be any type of general purpose processor, such as any type of processor generally found in a personal computer or the like. The processor 830 regulates all of the data gathering and processing, and interprets the inputs and commands to the respective components of the system. The input 810 serves the purpose of presenting spatially referenced field characteristic data to the system, particularly the processor 820 and memory 830, and may comprise any general purpose input device including a keyboard, as well as an optical or magnetic disk drive or modem. The input 810 serves the dual purpose of delivering spatially-referenced field characteristic data and user inputs to the processor. Therefore, it is to be understood that the use of the term "input" is used to include all those devices used to provide such information to the processor, and is not limited to the use of single such mode. In a preferred embodiment of the invention, the input will comprise a data reading device such as a disk drive for inputting spatially-referenced field characteristic data, and will also include a keyboard and or mouse for receiving user inputs. Alternatively, voice activation or touch screens could be used to receive inputs.

Georeferenced digital maps may be provided to a computer on a memory card, or on another storage medium used to transfer data to computer. The maps may include data representative of yield, moisture content, or any other characteristic of a field. Data may also be provided to a computer using other data structures, or may be provided by manually entering characteristic data with its position information. Other digital map structures may be used which correlate spatially-variable characteristic data with the position in the field where the data was taken.

The memory 830, may be any general purpose type of memory such as random-access memory (RAM), eraseable programmable read-only memory (EPROM) bubble memory, or other forms of magnetic storage media such as magnetic disc or tape.

The processor is attached to an output device 840 used to display the results of processing. The output device 840 may be any type of output suitable for representation of data such as a printer, a computer screen or a projection display. The output shown on the output device 840 may be in the form of textual data, yield maps, or other output representations. The output may also be saved to a memory, such as to a magnetic storage disc, or may be transferred to another electronic device, such as another computer, through a data port.

A personal computer is preferably used to carry out the instant invention. Such a personal computer will typically be a programmed personal computer and will include a memory, a processor, an output device such as a monitor or printer, and input devices such as a mouse, key board, modem or optical or magnetic disk drive. Any commercially available processor may be used to execute a program stored in memory or on a disk read by disk drive interface. Preferably, the processor reads spatially-referenced field characteristic data from a removable memory device, such as a disk. Data may also be entered using keyboard, mouse, or another interface.

V. Use of Remotely-Sensed Field Characteristic Data

Figure 8A:
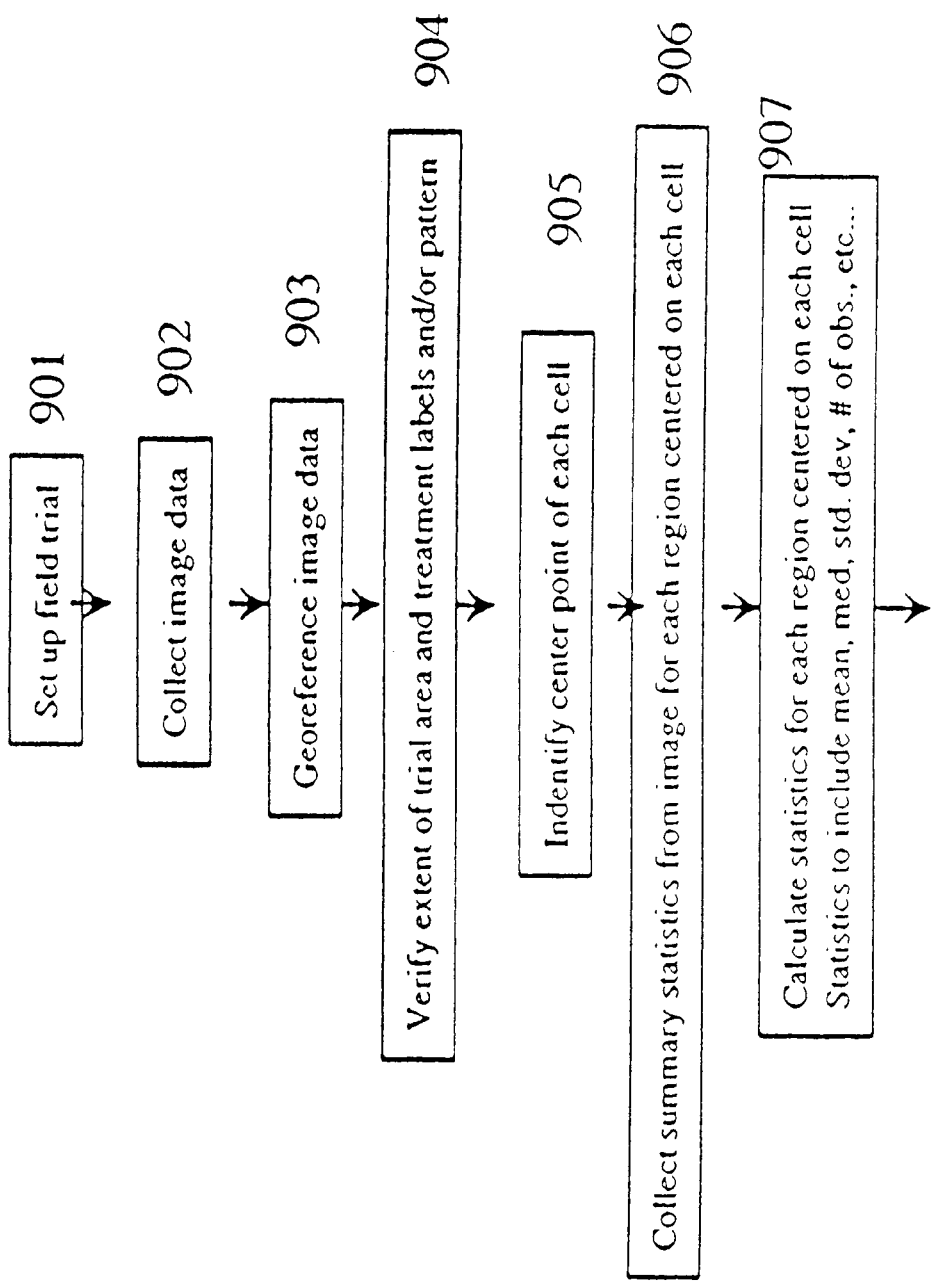
FIGS. 8A, 8B: Detailed flow chart for use of remotely-sensed data with the invention.
Figure 8B:
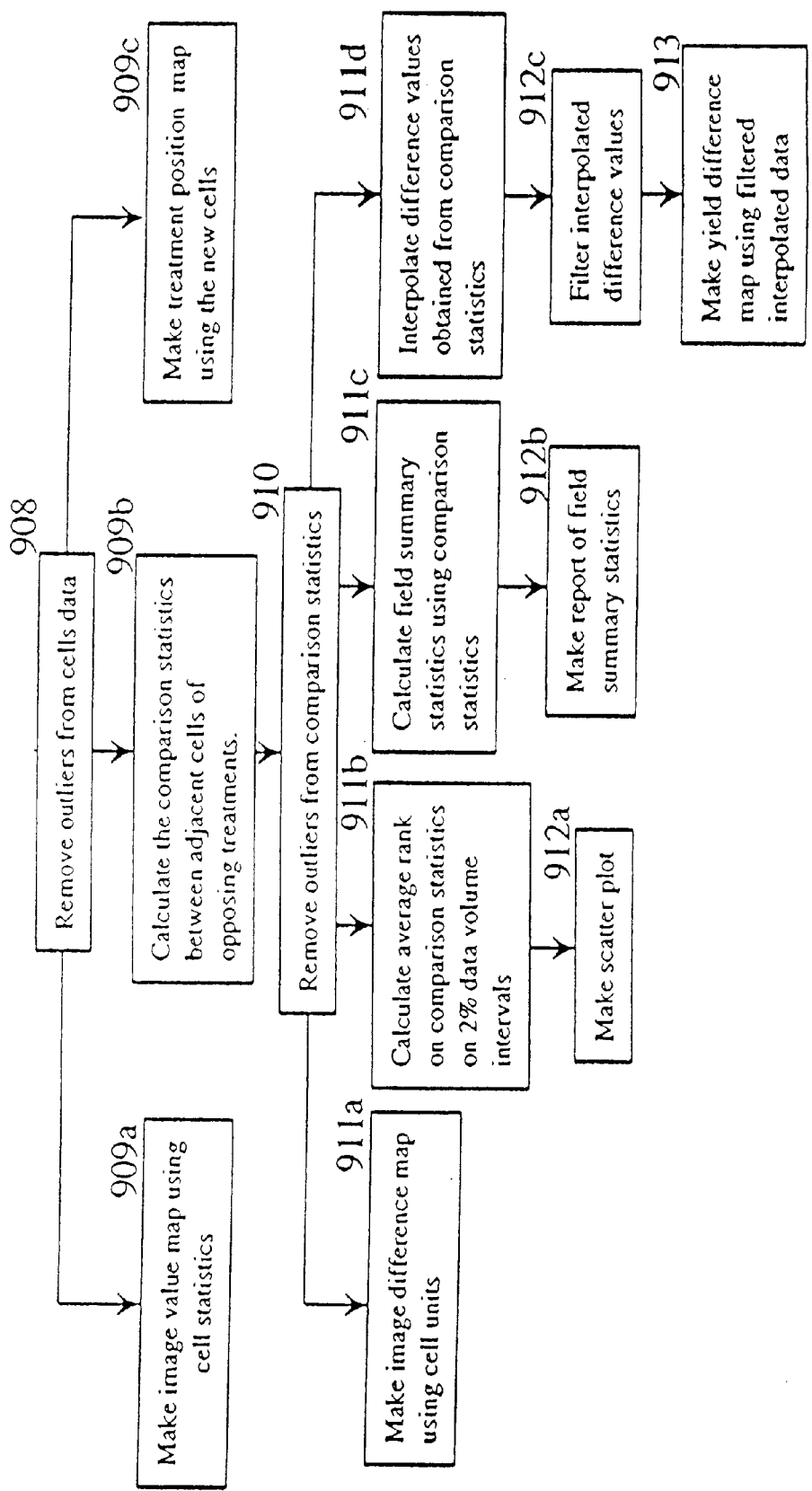

In one embodiment of the invention, spatially-referenced field characteristic data can be obtained by remote sensing. A detailed flow chart for the analysis of such data is provided, for exemplary purposes only, in FIG. 8. The results of an analysis carried out by this method are given in FIG. 9. The example illustrates the use of remotely sensed data for the prediction of differences in performance due to genetics spatially. The remote sensing data provided information regarding crop performance, and particularly, crop yield. In the example, the differences between the two hybrids detected with remotely sensed data were correlated with grain yield differences measured using a yield monitor. Measurements were made between the two hybrids as the environments changed across the field. The remotely sensed data was measuring light reflected from the crop canopy at approximately 640 nm from 6,000 feet above ground from an aircraft with a Positive Systems (Whitefish, Mont.) ADAR digital camera after the corn crop in the field had reached the R4 growth stage. The digital camera used a grid array capable of generating 1 m ground pixel resolution for the entire test area in a single image capture event (FIG. 8A, 8B, step 902). The remote sensing was carried out according to the method described in U.S. Pat. No. 5,764,819, the disclosure of which is specifically incorporated herein by reference in its entirety.

Field characteristic data also was obtained using a GPS mounted on a combine at harvest time (a GPS mounted on a tractor at planting time could similarly be used), thereby providing yield data which was spatially referenced by GPS (step 903) and allowing designation of data to a crop test area (step 904). The data obtained was then used to calculate cells based on length units as described above and the center point location of each cell (step 905), as calculated from the corresponding yield data (step 309), was used to direct a sampling of the remotely sensed data where the points intersected with the geo-referenced image data. The center point data provided an indication of the location of the respective crop test area. For this example, the mean brightness value from the image that intersected with each center point was used in a similar fashion as described in FIG. 3, step 309, for calculation of statistics. In this case, the image data is used instead of yield data.

Crop performance or field characteristic data was thus calculated for each cell (step 907). Remote sensing was used to obtain a digital quantification of reflected light from the crop canopy on an eight bit scale (0–255). This provided measure of meaningful plant traits, such as crop performance, for a given crop test area and the cells defined therein. Outlier cells could then be removed to prevent errors due to inclusion of the outliers in calculations (step 908). At this stage, an image value map could be made using cell statistics (step 909a), or a treatment position map could be made for the crop test areas and cells defined therein (step 909c). Adjacent cells were then compared for selected characteristics (step 909b). Outlier differences could also be removed at this stage (910). The differences are then presented in the format desired. For example, an image difference map can be made (step 911a). In this example, a scatter plot was made by calculating average rank on comparison statistics using 1% data volume intervals (steps 911b and 912a). The scatter plot calculated is given in FIG. 9. Alternatively, field summary statistics could be prepared using the comparison statistics and a report made of the summary statistics (steps 911c and 912b). Also, differences could be interpolated, filtered and used to make a difference map with the filtered interpolated data (steps 911d, 912c and 913).

Figure 9:
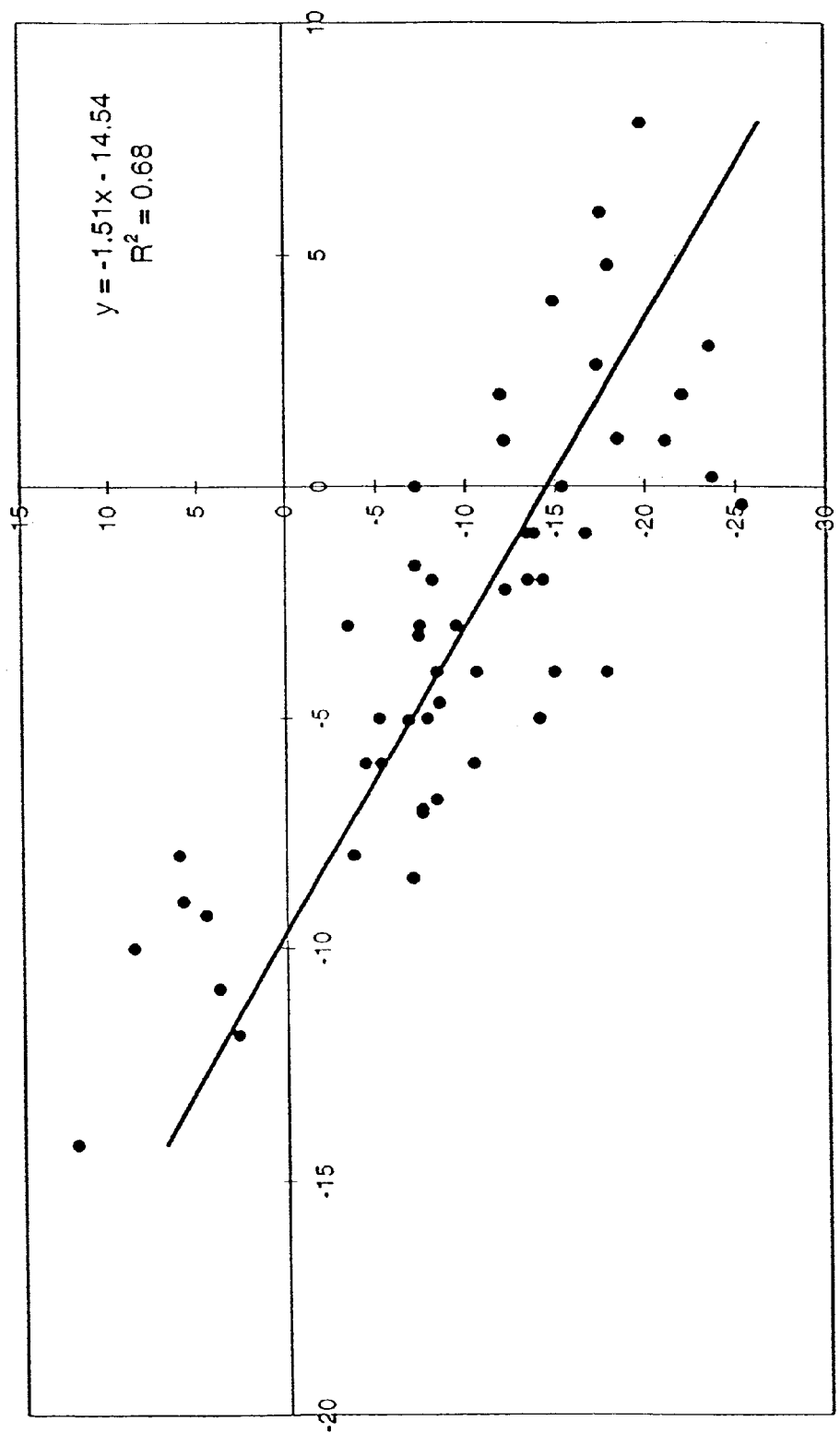
FIG. 9: Comparison between remotely sensed treatment differences and yield differences. The figure illustrates correlation of remotely sensed differences between corn hybrids and the actual grain yield differences measured between the hybrids. The X axis represents the reflected light measured from the crop canopy which has been processed to detect differences between the two corn hybrids. The Y axis represents the actual grain yield differences measured for the same cells that was used for the processing of the remotely sensed data.

The benefit of the use of remote sensing data is indicated by FIG. 9, which demonstrates use of remotely sensed data to estimate the G×E yield differences in a field without the need to measure yield with a GPS or yield monitor. The correlation shown between the remotely sensed data and the actual measured grain yield indicates that remote sensing could be used in the place of actual yield measurements to determine the differences between the two treatments (hybrids). The remote sensing data used may be in a form prepared in accordance with any of the techniques for calibrating and processing remotely sensed data known to those of skill in the art (see, e.g., U.S. Pat. No. 5,764,819). The method illustrated here provides benefit relative to the prior art in that it allows comparison of small subsets of adjacent treatment sections, permitting a more accurate, non-spatial comparison that otherwise would not be available.

VI. Obtaining Spatially Referenced Crop Performance Data

An example of a preferred method of obtaining spatially-referenced crop performance data for use with the invention is the use of a combine equipped with a yield monitor which is operatively linked to a georeferencing device, for example, a GPS monitor. Examples of such a devices include Ag Leader yield monitors commercially available from Ag Leader Technology, Ames, IA, and CaseAFS Yield Monitors, commercially available from the Case Corporation, Racine, Wis.

A farmer also could sample a field at different locations while traversing the field on foot. Also, site-specific characteristic data may be gathered by remote sensing from an airborne vehicle such as an airplane or a spaceborne platform such as a satellite (see, e.g., U.S. Pat. No. 5,764,819, the disclosure of which is specifically incorporated herein by reference in its entirety). Each technique for gathering site-specific data includes circuitry or sensors which determine a characteristic of the field at different locations and a location determining circuit which generates location signals representative of the locations at which the samples were taken.

For example, a farmer may gather site-specific data (e.g., grain flow and grain moisture content data) while harvesting a field of corn using combine. The combine is equipped with a data collection system which includes a processing unit, a memory (e.g., RAM, hard or floppy disk, PCMCIA memory card, etc.), a grain flow sensor, a grain moisture content sensor, a distance traveled (speed) sensor, a position unit, and a display (e.g., CRT, flat screen LCD display, etc.).

A combine linked to a yield monitor comprises a processing unit that receives signals representative of grain flow and moisture content from sensors and digitizes the signals using a converter circuit such as an analog-to-digital (A/D) converter. The flow sensor may include a load sensor attached to a steel plate which is struck by grain passing through the clean-grain elevator of combine to measure the force of the grain flow. A moisture sensor may be positioned near the auger tube of the combine to measure the moisture content of grain passing over the sensor.

A speed sensor may include a magnetic pickup sensor configured to sense the speed of the wheels or transmission of combine, or may include a radar device mounted to the body of the combine. The distance traveled is equal to the product of the vehicle speed and elapsed time. The vehicle speed may also be sensed by calculating the difference between successive position signals received from a position unit and dividing by the elapsed time. The processing unit also receives signals from a position unit, which represents the positions of the combine when the grain flow, speed (distance traveled) and moisture content were sampled. The processing unit correlates grain flow and moisture content data with position signals, and stores the data in memory.

Yield (e.g., bu/acre) is determined by dividing the quantity of sensed grain (e.g., bu) by the area of the field harvested (e.g., acres), wherein the quantity of sensed grain is the product of the grain flow rate and time, and the area is the product of the width of cut and distance traveled. The stored data comprises spatially referenced crop performance data, wherein each data point is digitized and stored in association with position data. The fact that a position is associated with the crop performance data allows the subsequent assignment of the data into cells. Preferably, each pass of a combine will be assigned by the operator to a particular crop test area, wherein the crop test area has received a particular treatment.

A georeferencing means preferably includes a global positioning system (GPS) signal receiver with an associated antenna and a differential GPS (DGPS) signal receiver with an associated antenna. Examples of suitable GPS receivers for use with the invention include, for example, those made by Trimble Navigation Ltd. of California, or the DGPS receiver made by Satloc, Inc. of Arizona. A GPS receiver determines the longitude and latitude coordinates (and altitude) of a combine from signals transmitted by the GPS satellite network. The accuracy of the position data is improved by applying correction signals received by a DGPS receiver. The differential correction signals are used to correct errors present on GPS signals including the selective availability error signal added to GPS signals by the U.S. government. DPGS correction signals are transmitted by the Coast Guard and by commercial services. The Omnistar DGPS system from John E. Chance & Assoc. of Texas, for example, includes a network of ten land-based differential reference stations which send correction signals to a master station which uploads signals to a satellite for broadcast throughout North America. Correction signals may also be transmitted from a local base station such as the top of a farm building.

Georeferencing techniques could also be used for the spatially-referenced application of a particular treatment to a crop test area. For example, if two treatment areas are desired to be located side by side, each differing in the type of seed applied to the treatment areas, a planter equipped with a georeferencing means could be used. This would provide information regarding the geographical location of particular treatments which could subsequently be used to assign a combine pass to a particular treatment and/or be used in the calculation of cells. Alternatively, georeferencing could be used to ensure a particular treatment, e.g., application of fertilizer or pesticide, is applied to the correct crop test area and further to store information regarding the application of such treatments. This could be achieved using, for example, a tractor equipped with a data collection system including a processing unit, a memory, an implement system, a speed sensor configured to sense the speed of tractor, a position unit and a display.

The processing unit may include a processor configured to control the application of a farming input, such as seeds or fertilizer, to the field according to a prescription map or an operator's commands. A processing unit may send commands to the implement system which includes one or more variable-rate controllers, actuators and application sensors. The commanded output rate is a function of the speed of the tractor and the desired application rate. For example, an increased speed will require an increased output rate to maintain a constant desired application rate. In response to the commands, variable-rate controllers generate control signals applied to actuators for controlling the application rate of farming inputs. Application sensors provide feedback signals to processing unit to enable closed-loop operation. Examples of variable-rate application systems include a variable-rate planter controller from Rawson Control Systems of Iowa and a variable-rate fertilizer spreader from Soil Teq., Inc. of Minnesota.

Either manual or automated georeferenced methods may also be used for the determination of environmental condition variables for particular regions of a crop test area. Such techniques allow, for example, the assignment of a given environmental condition variable to be determined for a cell which is defined within a crop test area. Correlations may then be made between treatments, the environmental condition variable and crop performance. Environmental condition data could be obtained, for example, by a farmer traversing a field in general purpose vehicle or on foot. For example, the farmer may see an area of insect infestation and note the location on a piece of paper, or may take soil probes while noting locations and send them to a laboratory for analysis. The location could be determined using a portable position unit with a display, such as a hand-held GPS signal receiver unit. Locations may also be determined in other ways, such as triangulation from landmarks at known locations. In this manner, the data obtained can be assigned to a crop test area or cells defined within the crop test area.

Spatially-referenced data relating to environmental conditions or crop performance could also be gathered remotely using a platform such as an airplane or a satellite. The platform may include a camera for photographing the field. The photographs may be georeferenced to the field using the known location of a landmark, or by circuitry which determines the area photographed by camera. The platform may also include a spectral sensor such as that used in a system for mapping a field for precision farming purposes (e.g., U.S. Pat. No. 5,467,271, specifically incorporated herein by reference in its entirety).

VII. Spatially Variable Field Characteristics

As indicated above, potentially any spatially variable field characteristic may be analyzed with the instant invention. A preferred use for the invention is in the analysis of the performance of crop varieties. Elite commercial varieties of crops are well known to those of skill in the agricultural arts, and seeds for such crops are commercially available, for example, from DEKALB Genetics Corporation, DeKalb, Ill., and from Asgrow Seed Company, Kalamazoo, Mich.

In one embodiment of the invention, crop performance is analyzed relative to one or more environmental condition variables. Frequently such factors will include measurements of soil conditions, such as nutrient content, soil compaction, and soil moisture. Alternatively, the factors will be farmer inputs, including application of soil amendments or plant nutrient factors. Another environmental factor that one may analyze in relation to crop performance with the invention is the degree of disease or pest infestation. By comparing the relative rates of pest or disease infestation alone, or in relation crop performance, the degree of resistance to pest or disease infestation of a particular variety may be determined. Some diseases for which one may wish to analyze resistance to in accordance with the invention include, but are not limited to, those given in Tables 2–5, below.

TABLE 2

Plant Virus and Virus-like Diseases

| DISEASE | CAUSATIVE AGENT |
| --- | --- |
| American wheat striate (wheat striate mosaic) | American wheat striate mosaic virus mosaic (AWSMV) |
| Barley stripe mosaic | Barley stripe mosaic virus (BSMV) |
| Barley yellow dwarf | Barley yellow dwarf virus (BYDV) |
| Brome mosaic | Brome mosaic virus (BMV) |
| Cereal chlorotic mottle* | Cereal chlorotic mottle virus (CCMV) |
| Corn chlorotic vein banding (Brazilian maize mosaic)[1] | Corn chlorotic vein banding virus (CCVBV) |
| Corn lethal necrosis | Virus complex (Maize chlorotic mottle virus (MCMV) and Maize dwarf mosaic virus (MDMV) A or B or Wheat streak mosaic virus (WSMV)) |
| Cucumber mosaic | Cucumber mosaic virus (CMV) |
| Cynodon chlorotic streak*[1] | Cynodon chlorotic streak virus (CCSV) |
| Johnsongrass mosaic | Johnsongrass mosaic virus (JGMV) |
| Maize bushy stunt | Mycoplasma-like organism (MLO) associated |
| Maize chlorotic dwarf | Maize chlorotic dwarf virus (MCDV) |
| Maize chlorotic mottle | Maize chlorotic mottle virus (MCMV) |
| Maize dwarf mosaic | Maize dwarf mosaic virus (MDMV) strains A, D, E and F |
| Maize leaf fleck | Maize leaf fleck virus (MLFV) |
| Maize line* | Maize line virus (MLV) |
| Maize mosaic (corn leaf stripe, enanismo rayado) | Maize mosaic virus (MMV) |
| Maize mottle and chlorotic stunt[1] | Maize mottle and chlorotic stunt virus* |
| Maize pellucid ringspot* | Maize pellucid ringspot virus (MPRV) |
| Maize raya gruesa*[1] | Maize raya gruesa virus (MRGV) |
| maize rayado fino* (fine striping disease) | Maize rayado fino virus (MRFV) |
| Maize red leaf and red stripe* | Mollicute? |
| Maize red stripe* | Maize red stripe virus (MRSV) |
| Maize ring mottle* | Maize ring mottle virus (MRMV) |
| Maize rio IV* | Maize rio cuarto virus (MRCV) |
| Maize rough dwarf* (nanismo ruvido) | Maize rough dwarf virus (MRDV) (= Cereal tillering disease virus*) |
| Maize sterile stunt* | Maize sterile stunt virus (strains of barley yellow striate virus) |
| Maize streak* | Maize streak virus (MSV) |
| Maize stripe (maize chlorotic stripe, maize hoja blanca) | Maize stripe virus |
| Maize stunting*[1] | Maize stunting virus |
| Maize tassel abortion* | Maize tassel abortion virus (MTAV) |
| Maize vein enation* | Maize vein enation virus (MVEV) |
| Maize wallaby ear* | Maize wallaby ear virus (MWEV) |

TABLE 2-continued

Plant Virus and Virus-like Diseases

| DISEASE | CAUSATIVE AGENT |
|---|---|
| Maize white leaf* | Maize white leaf virus |
| Maize white line mosaic | Maize white line mosaic virus (MWLMV) |
| Millet red leaf* | Millet red leaf virus (MRLV) |
| Northern cereal mosaic* | Northern cereal mosaic virus (NCMV) |
| Oat pseudorosette* (zakuklivanie) | Oat pseudorosette virus |
| Oat sterile dwarf* | Oat sterile dwarf virus (OSDV) |
| Rice black-streaked dwarf* | Rice black-streaked dwarf virus (RBSDV) |
| Rice stripe* | Rice stripe virus (RSV) |
| Sorghum mosaic | Sorghum mosaic virus (SrMV), formerly sugarcane mosaic virus (SCMV) strains H, I and M |
| Sugarcane Fiji disease* | Sugarcane Fiji disease virus (FDV) |
| Sugarcane mosaic | Sugarcane mosaic virus (SCMV) strains A, B, D, E, SC, BC, Sabi and MB (formerly MDMV-B) |
| Vein enation*[1] | Virus? |
| Wheat spot mosaic | Wheat spot mosaic virus (WSMV) |

*Not known to occur naturally on corn in the United States.
[1]Minor viral disease.

TABLE 3

Plant Bacterial Diseases

| DISEASE | CAUSATIVE AGENT |
|---|---|
| Bacterial leaf blight and stalk rot | *Pseudomonas avenae* subsp. *Avenae* |
| Bacterial leaf spot | *Xanthomonas campestris* pv. *holcicola* |
| Bacterial stalk rot | *Enterobacter dissolvens* = *Erwinia dissolvens* |
| Bacterial stalk and top rot | *Erwinia carotovora* subsp. *Carotovora*, *Erwinia chrysanthemi* pv. *zeae* |
| Bacterial stripe | *Pseudomonas andropogonis* |
| Chocolate spot | *Pseudomonas syringae* pv. *coronafaciens* |
| Goss's bacterial wilt and blight (leaf freckles and wilt) | *Clavibacter michiganensis* subsp. *nebraskensis* = *Corynebacterium michiganense* pv. *nebraskense* |
| Holcus spot | *Pseudomonas syringae* pv. *syringae* |
| Purple leaf sheath | Hemiparasitic bacteria + (See under Fungi) |
| Seed rot-seedling blight | *Bacillus subtilis* |
| Stewart's disease (bacterial wilt) | *Pantoea stewartii* = *Erwinia stewartii* |
| Corn stunt (achapparramiento, maize stunt, Mesa Central or Rio Grande maize stunt) | *Spiroplasma kunkelii* |

TABLE 4

Plant Fungal Diseases

| DISEASE | PATHOGEN |
|---|---|
| Anthracnose leaf blight and anthracnose stalk rot | *Colletotrichum graminicola* (teleomorph: *Glomerella graminicola* Politis), *Glomerella tucumanensis* (anamorph: *Glomerella falcatum* Went) |
| Aspergillus ear and kernel rot | *Aspergillus flavus* Link: Fr. |
| Banded leaf and sheath spot* | *Rhizoctonia solani* Kühn = *Rhizoctonia microsclerotia* J. Matz (teleomorph: *Thanatephorus cucumeris*) |
| Black bundle disease | *Acremonium strictum* W. Gams = *Cephalosporium acremonium* Auct. non Corda |
| Black kernel rot* | *Lasiodiplodia theobromae* = *Botryodiplodia theobromae* |
| Borde blanco* | *Marasmiellus* sp. |
| Brown spot (black spot, stalk rot) | *Physoderma maydis* |
| Cephalosporium kernel rot | *Acremonium strictum* = *Cephalosporium acremonium* |
| Charcoal rot | *Macrophomina phaseolina* |
| Corticium ear rot* | *Thanatephorus cucumeris* = *Corticium sasakii* |
| Curvularia leaf spot | *Curvularia clavata, C. eragrostidis,* =*C. maculans* (teleomorph: *Cochliobolus eragrostidis*), *Curvularia inaequalis, C. intermedia* (teleomorph: *Cochliobolus intermedius*), *Curvularia lunata* (teleomorph: *Cochliobolus lunatus*), *Curvularia pallescens* (teleomorph: *Cochliobolus pallescens*), *Curvularia senegalensis, C. tuberculata* (teleomorph: *Cochliobolus tuberculatus*) |
| Didymella leaf spot* | *Didymella exitalis* |
| Diplodia ear rot and stalk rot | *Diplodia frumenti* (teleomorph: *Botryosphaeria festucae*) |
| Diplodia ear rot, stalk rot, seed rot and seedling blight | *Diplodia maydis* = *Stenocarpella maydis* |
| Diplodia leaf spot or leaf streak | *Stenocarpella macrospora* = *Diplodia macrospora* |

*Not known to occur naturally on corn in the United States.

TABLE 5

Plant Downy Mildews

| DISEASE | CAUSATIVE AGENT |
| --- | --- |
| Brown stripe downy mildew* | *Sclerophthora rayssiae* var. *zeae* |
| Crazy top downy mildew | *Sclerophthora macrospora* = *Sclerospora macrospora* |
| Green ear downy mildew (graminicola downy mildew) | *Sclerospora graminicola* |
| Java downy mildew* | *Peronosclerospora maydis* = *Sclerospora maydis* |
| Philippine downy mildew* | *Peronosclerospora philippinensis* = *Sclerospora philippinensis* |
| Sorghum downy mildew | *Peronosclerospora sorghi* = *Sclerospora sorghi* |
| Spontaneum downy mildew* | *Peronosclerospora spontanea* = *Sclerospora spontanea* |
| Sugarcane downy mildew* | *Peronosclerospora sacchari* = Sclerospora *sacchari* |
| Dry ear rot (cob, kernel and stalk rot) | *Nigrospora oryzae* (teleomorph: *Khuskia oryzae*) |
| Ear rots, minor | *Alternaria alternata* = *A. tenuis, Aspergillus glaucus, A. niger,* Aspergillus spp., *Botrytis cinerea* (teleomorph: *Botryotinia fuckeliana*), Cunninghamella sp., *Curvularia pallescens, Doratomyces stemonitis* = *Cephalotrichum stemonitis, Fusarium culmorum, Gonatobotrys simplex, Pithomyces maydicus, Rhizopus microsporus* Tiegh., *R. stolonifer* = *R. nigricans, Scopulariopsis brumptii.* |
| Ergot* (horse's tooth, diente de caballo) | *Claviceps gigantea* (anamorph: Sphacelia sp.) |
| Eyespot | *Aureobasidium zeae* = *Kabatiella zeae* |
| Fusarium ear and stalk rot | *Fusarium subglutinans* = F. moniliforme var. *subglutinans* |
| Fusarium kernel, root and stalk rot, seed rot and seedling blight | Fusarium moniliforme (teleomorph: *Gibberella fujikuroi*) |
| Fusarium stalk rot, seedling root rot | *Fusarium avenaceum* (teleomorph: *Gibberella avenacea*) |
| Gibberella ear and stalk rot | *Gibberella zeae* (anamorph: *Fusarium graminearum*) |
| Gray ear rot | *Botryosphaeria zeae* = *Physalospora zeae* (anamorph: *Macrophoma zeae*) |
| Gray leaf spot (Cercospora leaf spot) | *Cercospora sorghi* = *C. sorghi* var. *maydis, C.* zeae-maydis |
| Helminthosporium root rot | *Exserohium pedicellatum* = *Helminthosporium pedicellatum* (teleomorph: *Setospliaeria pedicellata*) |
| Hormodendrum ear rot (Cladosporium rot) | *Cladosporium cladosporioides* = *Hormodendrum cladosporioides, C. herbarum* (teleomorph: *Mycosphaerella tassiana*) |
| Hyalothyridium leaf spot* | *Hyalothyridium maydis* |
| Late wilt* | *Cephalosporium maydis* |
| Leaf spots, minor | *Alternaria alternata, Ascochyta maydis, A. tritici, A. zeicola, Bipolaris victoriae* = *Helminthosporium victoriae* (teleomorph: *Cochliobolus victoriae*), *C. sativus* (anamorph: *Bipolaris sorokiniana* = *H. sorokinianum* = *H. sativum*), *Epicoccum nigrum, Exserohilum prolatum* = *Drechslera prolata* (teleomorph: *Setosphaeria prolata*) *Graphium penicillioides, Leptosphaeria maydis, Leptothyrium zeae, Ophiosphaerella herpotricha,* (anamorph: Scolecosporiella sp.), *Paraphaeosphaeria michotii,* Phoma sp., *Septoria zeae, S. zeicola, S. zeina* |
| Northern corn leaf blight (white blast, crown stalk rot, stripe) | *Setosphaeria turcica* (anamorph: *Exserohilum turcicum* = *Helminthosporium turcicum*) |
| Northern corn leaf spot, Helminthosporium ear rot (race I) | *Cochliobolus carbonum* (anamorph: *Bipolaris zeicola* = *Helminthosporium carbonum*) |
| Penicillium ear rot (blue eye, blue mold) | Penicillium spp., *P. chrysogenum, P. expansum, P. oxalicum* |
| Phacocytostroma stalk rot and root rot | *Phaeocytostroma ambiguum,* = *Phaeocytosporella zeae* |
| Phaeosphaeria leaf spot* | *Phaeosphaeria maydis* = *Sphaerulina maydis* |
| Physalospora ear rot (Botryosphaeria ear rot) | *Botryosphaeria festucae* = *Physalospora zeicola* (anamorph: *Diplodia frumenti*) |
| Purple leaf sheath | Hemiparasitic bacteria and fungi |
| Pyrenochaeta stalk rot and root rot | *Phoma terrestris* = *Pyrenochaeta terrestris* |
| Pythium root rot | Pythium spp., *P. arrhenomanes, P.* |

TABLE 5-continued

Plant Downy Mildews

| DISEASE | CAUSATIVE AGENT |
|---|---|
| | graminicola |
| Pythium stalk rot | Pythium aphanidermatum = P. butleri L. |
| Red kernel disease (ear mold, leaf and seed rot) | Epicoccum nigrum |
| Rhizoctonia ear rot (sclerotial rot) | Rhizoctonia zeae (teleomorph: Waitea circinata) |
| Rhizoctonia root rot and stalk rot | Rhizoctonia solani, Rhizoctonia zeae |
| Root rots, minor | Alternaria alternata, Cercospora sorghi, Dictochaeta fertilis, Fusarium acuminatum (teleomorph: Gibberella acuminata), F. equiseti (teleomorph: G. intricans), F. oxysporum, F. pallidoroseum, F. poae, F. roseum, G. cyanogena, (anamorph: F. sulphureum), Microdochium bolleyi, Mucor sp., Periconia circinata, Phytophthora cactorum, P. drechsleri, P. nicotianae var. parasitica, Rhizopus arrhizus |
| Rostratum leaf spot (Helminthosporium leaf disease, ear and stalk rot) | Setosphaeria rostrata, (anamorph: Exserohilum rostratum = Helminthosporium rostratum) |
| Rust, common corn | Puccinia sorghi |
| Rust, southern corn | Puccinia polysora |
| Rust, tropical corn | Physopella pallescens, P. zeae = Angiopsora zeae |
| Sclerotium ear rot* (southern blight) | Sclerotium rolfsii Sacc. (teleomorph: Athelia rolfsii) |
| Seed rot-seedling blight | Bipolaris sorokiniana, B. zeicola = Helminthosporium carbonum, Diplodia maydis, Exserohilum pedicillatum, Exserohilum turcicum = Helminthosporium turcicum, Fusarium avenaceum, F. culmorum, F. moniliforme, Gibberella zeae (anamorph: F. graminearum), Macrophomina phaseolina, Penicillium spp., Phomopsis sp., Pythium spp., Rhizoctonia solani, R. zeae, Sclerotium rolfsii, Spicaria sp. |
| Selenophoma leaf spot* | Selenophonia sp. |
| Sheath rot | Gaeumannomyces graminis |
| Shuck rot | Myrothecium gramineum |
| Silage mold | Monascus purpureus, M. ruber |
| Smut, common | Ustilago zeae = U. maydis) |
| Smut, false | Ustilaginoidea virens |
| Smut, head | Sphacelotheca reiliana = Sporisorium holci-sorghi |
| Southern corn leaf blight and stalk rot | Cochliobolus heterostrophus (anamorph: Bipolaris maydis = Helminthosporium maydis) |
| Southern leaf spot | Stenocarpella macrospora = Diplodia macrospora |
| Stalk rots, minor | Cercospora sorghi, Fusarium episphaeria, F. merismoides, F. oxysporum Schlechtend, F. poae, F. roseum, F. solani (teleomorph: Nectria haematococca), F. tricinctum, Mariannaea elegans, Mucor sp., Rhopographus zeae, Spicaria sp. |
| Storage rots | Aspergillus spp., Penicillium spp. and other fungi |
| Tar spot* | Phyllachora maydis |
| Trichoderma ear rot and root rot | Trichoderma viride = T. lignorum teleomorph: Hypocrea sp. |
| White ear rot, root and stalk rot | Stenocarpella maydis = Diplodia zeae |
| Yellow leaf blight | Ascochyta ischaemi, Phyllosticta maydis (teleomorph: Mycosphaerella zeae-maydis) |
| Zonate leaf spot | Gloeocercospora sorghi |

*Not known to occur naturally on corn in the United States.

In the invention will also find utility in the analysis of crop resistance to pest infestation. Exemplary pests include insects and nematodes. Some insects for which one may wish to analyze resistance to in accordance with the invention include, but are not limited to, Lepidoptera species (butterflies and moths) such as Heliothis spp., including Heliothis virescens (tobacco budworm), Heliothis artnigera and Heliothis zea, Spodoptera spp. such as S. exempta, S. frugiperda, S. exiqua, S. littoralis (Egyptian cotton worm), S. eridania (southern army worm), and Mamestra configurata (bertha army worm); Earias spp. e.g. E. insulana (Egyptian bollworm), Pectinophora spp. e.g. Pectinophora gossypiella (pink bollworm), Ostrinia spp. such as O. nubilalis (European cornborer), Trichoplusia ni (cabbage looper), Artogeia spp. (cabbage worms), Laphygma spp. (army worms), Agrotis and Amathes spp. (cutworms), Wiseana spp. (porina moth), Chilo spp. (rice stem borer), Tryporza spp. and Diatraea spp. (sugar cane borers and rice borers), *Sparganothis pilleriana* (grape berry moth), *Cydia pomonella* (codling moth), *Archips* spp. (fruit tree tortrix moth), and *Plutella xylostella* (diamond back moth).

Such insects may also include, for example, Coleoptera species (beetles), including *Hypothenemus hampei* (coffee berry borer), *Hylesinus* spp. (bark beetles), *Anthonomus* spp. e.g. *grandis* (cotton boll weevil), *Acalymma* spp. (cucumber beetles), *Lema* spp., *Psylliodes* spp., *Leptinotarsa decemlineata* (Colorado potato beetle), *Diabrotica* spp. (corn rootworms), *Gonocephalum* spp. (false wire worms), *Agriotes* spp., *Limonius* spp. (wireworms), *Dermolepida* spp., *Popillia* spp., *Heteronychus* spp. (white grubs), *Phaedon cochleariae* (mustard beetle), *Epitrix* spp. (flea beetles), *Lissorhoptrus oryzophilus* (rice water weevil), *Meligethes* spp. (pollen beetles), *Ceutorhynchus* spp., *Rhynchophorus* and *Cosmopolites* spp. (root weevils).

Examples of some nematode-associated plant diseases, the resistance to which could be analyzed with the invention, include those given below, in Table 6.

TABLE 6

Parasitic Nematodes

| DISEASE | PATHOGEN |
| --- | --- |
| Awl | *Dolichodorus* spp., *D. heterocephalus* |
| Bulb and stem (Europe) | *Ditylenchus dipsaci* |
| Burrowing | *Radopholus similis* |
| Cyst | *Heterodera avenae*, *H. zeae*, *Punctodera chalcoensis* |
| Dagger | *Xiphinema* spp., *X. americanum*, *X. mediterraneum* |
| False root-knot | *Nacobbus dorsalis* |
| Lance, Columbia | *Hoplolaimus columbus* |
| Lance | *Hoplolaimus* spp., *H. galeatus* |
| Lesion | *Pratylenchus* spp., *P. brachyurus*, *P. crenatus*, *P. hexincisus*, *P. neglectus*, *P. penetrans*, *P. scribneri*, *P. thornei*, *P. zeae* |
| Needle | *Longidorus* spp., *L. breviannulatus* |
| Ring | *Criconemella* spp., *C. ornata* |
| Root-knot | *Meloidogyne* spp., *M. chitwoodi*, *M. incognita*, *M. javanica* |
| Spiral | *Helicotylenchus* spp. |
| Sting | *Belonolaimus* spp., *B. longicaudatus* |
| Stubby-root | *Paratrichodorus* spp., *P. christiei*, *P. minor*, *Quinisulcius acutus*, *Trichodorus* spp. |
| Stunt | *Tylenchorhynchus dubius* |

VIII. Definitions

A crop performance variable is defined as a quantifiable variable relating to the relative agronomic performance of a crop. Exemplary crop performance variables include yield, moisture content, protein content, oil content, and nutrient content.

A crop test area is a region of a field which differs from an adjacent crop test area in one or more characteristics which the user of the invention seeks to gain information regarding the effect of. For example, a crop test area may be planted with a crop variety that differs from that of an adjacent crop test area, thereby allowing comparison of any differences in crop performance between the varieties. A preferred crop test area comprises a row or rows of planted crops which essentially correspond to the width of the combine used to harvest the crops within the crop test area.

An environmental condition variable is defined as a quantifiable variable relating to the environment in which a crop grows. Environmental condition variables may comprise measurements of inputs by the farmer, such as application of plant nutrient factors or soil amendments, and can also comprise naturally occurring conditions such as measurements regarding soil condition or pest or disease infestation.

Plant nutrient factors are defined as the elements essential for crop growth.

Precision agricultural techniques are defined as methods of obtaining a combination of agronomic data coupled with spatial location, or of executing agronomic practices based on spatial location. The agronomic data may be currently generated or be retrieved historical data.

Soil amendments are defined as any compound added to enhance crop growth such as lime, growth hormones, or mycorrhizas.

A spatially-variable field characteristic is defined as a quantifiable characteristic measured for a particular crop test area. Exemplary field characteristics include crop performance variables, such as yield, moisture, protein content, and oil content, as well as environmental condition variables such as soil pH, soil moisture, soil fertility, soil type, soil compaction, disease infestation and pest infestation.

Variety is defined as a crop of a particular genotype. Different varieties are plants which differ in at least one locus that confers an observable or measurable phenotypic trait. Exemplary differences include one or more added transgenes.

All of the methods and systems disclosed and claimed herein can be made and executed without undue experimentation in light of the present disclosure. While the methods and systems of this invention have been described in terms of preferred embodiments, it will be apparent to those of skill in the art that variations may be applied to the systems and methods and in the steps or in the sequence of steps of the methods described herein without departing from the concept, spirit and scope of the invention. All such similar substitutions and modifications apparent to those skilled in the art are deemed to be within the spirit, scope and concept of the invention as defined by the appended claims.

References

The following references, to the extent that they provide exemplary procedural or other details supplementary to those set forth herein, are specifically incorporated herein by reference.

U.S. Pat. No. 5,318,475
U.S. Pat. No. 5,467,271
U.S. Pat. No. 5,480,354
U.S. Pat. No. 5,764,819
U.S. Pat. No. 5,771,169
U.S. Pat. No. 5,779,541

What is claimed is:

1. A method of determining a difference in the value of a first spatially-variable field characteristic, said method comprising the steps of:

a) preparing a field, wherein said field comprises a first and a second crop test area;

b) obtaining spatially-referenced field characteristic data for a designated region of said field, wherein said region comprises said first and said second crop test areas;

c) designating said spatially-referenced field characteristic data to said first or said second crop test area;

d) defining cells in said first and said second crop test areas, wherein said defining comprises designating length units within said first and said second crop test areas; and e) comparing said field characteristic data for a first cell from said first crop test area to an adjacent first cell from said second crop test area to identify a difference in the value of said field characteristic data.

2. The method of claim 1, wherein said first and said second crop test areas differ in the genotype of seed planted.

3. The method of claim 2, wherein said first and said second crop test areas comprise seed of the same species but of different varieties.

4. The method of claim 3, wherein said species is selected from the group consisting of wheat, maize, rye, rice, oat, barley, turfgrass, sorghum, sugarcane, millet, tobacco, tomato, potato, soybean, cotton, canola, alfalfa, sunflower, sugarbeets, peanuts, broccoli, carrots, peppers, raspberry, banana, apple, pear, peach, forage grass and hay.

5. The method of claim 4, wherein the species is maize and said first and second crop test areas are planted with different hybrid varieties of said maize.

6. The method of claim 4, wherein the species is soybean.

7. The method of claim 3, wherein said varieties differ in a single locus.

8. The method of claim 3, wherein said varieties differ in at least 2 loci.

9. The method of claim 3, wherein said varieties are hybrid varieties.

10. The method of claim 3, wherein said varieties are inbred varieties.

11. The method of claim 1, further comprising creating a visual representation of said difference.

12. The method of claim 11, wherein said difference is displayed using symbols, wherein said symbols correspond to the magnitude of said difference in said field characteristic data.

13. The method of claim 12, wherein said difference is displayed alphanumerically.

14. The method of claim 11, wherein said difference is displayed using colors corresponding to the magnitude of said difference in said field characteristic data.

15. The method of claim 11, wherein said creating a visual representation comprises creating a graph.

16. The method of claim 11, wherein said visual representation is spatially oriented relative to said designated region of said field.

17. The method of claim 11, wherein said visual representation is non-spatially oriented relative to said designated region of said field.

18. The method of claim 11, wherein said step of obtaining spatially-referenced field characteristic data comprises measuring crop yield.

19. The method of claim 1, wherein said step of obtaining spatially-referenced field characteristic data comprises measuring a crop performance variable.

20. The method of claim 19, wherein said crop performance variable comprises grain moisture.

21. The method of claim 19, wherein crop performance variable comprises protein content.

22. The method of claim 19, wherein said crop performance variable comprises oil content.

23. The method of claim 19, wherein said crop performance variable comprises starch content.

24. The method of claim 19, wherein said crop performance variable comprises plant stand.

25. The method of claim 19, wherein said crop performance variable is selected from the group consisting of plant height, stalk thickness and canopy density.

26. The method of claim 1, wherein said step of obtaining spatially-referenced field characteristic data for a designated region of said field comprises obtaining data for an environmental condition variable and for a crop performance variable.

27. The method of claim 26, comprising the step of calculating a correlation between said environmental condition variable and said crop performance variable.

28. The method of claim 27, wherein said correlation is determined by regressing said environmental condition variable relative to said crop performance variable.

29. The method of claim 26, wherein said environmental condition variable is selected from the group consisting of soil pH, soil moisture, soil fertility, soil type, soil compaction, disease infestation and pest infestation.

30. The method of claim 27, wherein said pest infestation is insect infestation.

31. The method of claim 27, wherein said pest infestation is nematode infestation.

32. The method of claim 1, wherein said spatially-referenced field characteristic data comprises an environmental condition variable.

33. The method of claim 32, wherein said environmental condition variable is selected from the group consisting of soil pH, soil moisture, soil fertility, soil type, soil compaction, disease infestation and pest infestation.

34. The method of claim 33, wherein said pest infestation is insect infestation.

35. The method of claim 33, wherein said pest infestation is nematode infestation.

36. The method of claim 1, wherein said field further comprises a third crop test area.

37. The method of claim 36, wherein said field further comprises a fourth crop test area.

38. The method of claim 37, wherein said field further comprises a fifth crop test area.

39. The method of claim 38 wherein said field further comprises from about 6 to about 30 crop test areas.

40. The method of claim 1, wherein said first and said second crop test areas differ in the method of cultivation.

41. The method of claim 40, wherein said method of cultivation comprises application of plant nutrient factors or soil amendments.

42. The method of claim 40, wherein said method of cultivation comprises application of insecticide.

43. The method of claim 40, wherein said method of cultivation comprises application of herbicide.

44. The method of claim 1, further comprising calculating an average of said spatially-referenced field characteristic data for said cells.

45. The method of claim 44, wherein an outlier cell is identified by comparison to said average and said outlier cell is not compared to an adjacent cell.

46. The method of claim 45, wherein said comparison to the average is made based on the standard of deviation or number of data points of said outlier cell relative to said average.

47. The method of claim 1, wherein said step obtaining spatially-referenced field characteristic data comprises using a yield monitor linked to a georeferencing means.

48. The method of claim 47, wherein said georeferencing means comprises GPS.

49. The method of claim 1, wherein said step of comparing comprises calculating a quantitative difference in said field characteristic data between said first cell and said adjacent first cell.

50. The method of claim 49, wherein said calculating comprises subtracting the value of said field characteristic data for said first cell from the value of said field characteristic data for said adjacent first cell.

51. The method of claim 1, wherein said step obtaining spatially-referenced field characteristic data comprises using remote sensing.

52. The method of claim 1, wherein said step obtaining spatially-referenced field characteristic data comprises using precision agricultural techniques.

53. The method of claim 1, wherein said designating comprises assigning a pass of a combine to said first or said second crop test region.

54. A system for determining a difference in a first spatially-variable field characteristic, comprising:
   a) a first input device for receiving spatially-referenced field characteristic data;
   b) a second input device for receiving user commands;
   c) a processor unit communicating with said first and said second input device to designate said field characteristic data to a first crop test area or a second crop test area according to said user commands, to define cells from said first crop test area or said second crop test area based on the user commands, and to calculate a difference between a first cell from said first crop test area and an adjacent first cell from said second crop test area; and
   d) an output device for displaying said difference.

55. The system of claim 54, wherein said first input device is selected from the group consisting of a keyboard, an optical or magnetic disk drive, a touch screen, a voice activated input device and a modem.

56. The system of claim 55, wherein s aid first input device is an optical or magnetic disk drive.

57. The system of claim 54, wherein said second input device is selected from the group consisting of a keyboard, an optical or magnetic disk drive, a touch screen, a voice activated input device and a modem.

58. The system of claim 57, wherein said second input device is a keyboard.

59. The system of claim 54, wherein said output device is selected from the group consisting of a color monitor, a monochrome monitor and a printer.

60. The system of claim 59, wherein said output device printer.

61. A system for determining a difference in a spatially-variable field characteristic, comprising:
   a) a first input means for receiving spatially-referenced field characteristic data;
   b) a second input means for receiving user commands;
   c) a processing means communicating with said first and said second input device to designate said field characteristic data to a first crop test area or a second crop test area according to said user commands, to define cells from said first crop test area or said second crop test area based on the user commands, and to calculate a difference between a first cell from said first crop test area and an adjacent first cell from said second crop test area; and
   d) an output means for displaying said difference.

62. The system of claim 61, wherein said first input means is selected from the group consisting of a keyboard, an optical or magnetic disk drive, a touch screen, a voice activated input device and a modem.

63. The system of claim 62, wherein said first input means is an optical or magnetic disk drive.

64. The system of claim 61, wherein said second input means is selected from the group consisting of a keyboard, an optical or magnetic disk drive, a touch screen, a voice activated input device and a modem.

65. The system of claim 64, wherein said second input means is a keyboard.

66. The system of claim 61, wherein said output means is selected from the group consisting of a color monitor, a monochrome monitor and a printer.

67. The system of claim 66, wherein said output means is a printer.

68. The system of claim 61, further defined as comprising a processing means for calculating a correlation between said difference and an environmental condition variable.

* * * * *

UNITED STATES PATENT AND TRADEMARK OFFICE
CERTIFICATE OF CORRECTION

PATENT NO.    : 6,505,146 B1
DATED         : January 7, 2003
INVENTOR(S)   : Blackmer It is certified that error appears in the above-identified patent and that said Letters Patent is hereby corrected as shown below:

<u>Column 31,</u>
Line 24, please delete "s aid" and insert -- said -- therefor.
Line 35, please delete "device" and insert -- device is a -- therefor.

Signed and Sealed this

Eleventh Day of March, 2003

JAMES E. ROGAN
*Director of the United States Patent and Trademark Office*